United States Patent
Gillam

(10) Patent No.: US 6,513,002 B1
(45) Date of Patent: *Jan. 28, 2003

(54) RULE-BASED NUMBER FORMATTER

(75) Inventor: Richard Gillam, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/022,191

(22) Filed: Feb. 11, 1998

(51) Int. Cl.[7] ............................ G06F 17/27; G10L 15/00
(52) U.S. Cl. ............................................ 704/9; 704/257
(58) Field of Search .................................. 704/1–8, 257, 704/258, 270; 707/540, 541; 382/137, 138

(56) References Cited

U.S. PATENT DOCUMENTS

| | | | | |
|---|---|---|---|---|
| 4,811,400 A | * | 3/1989 | Fisher et al. ................. | 704/258 |
| 5,781,884 A | * | 7/1998 | Pereira et al. ............... | 704/260 |
| 5,878,393 A | * | 3/1999 | Hata et al. ................... | 704/260 |
| 5,970,449 A | * | 10/1999 | Alleva et al. ................ | 704/235 |

\* cited by examiner

*Primary Examiner*—Patrick N. Edouard
(74) *Attorney, Agent, or Firm*—Kudirka & Jobse, LLP

(57) ABSTRACT

A number translation engine is based on a textual description of the procedure for spelling out a number in any of a variety of languages. The number translation engine comprises an output alphabetical representation formatter which, in turn, comprises a formatting engine and rule set. Each rule within a rule set includes a base output alphabetical representation and an indication to the formatting engine, either implicitly or explicitly, of a range of numerical values for which the rule applies. The formatting engine obtains a base output alphabetical representation from an appropriate rule within a rule set and builds up an output alphabetical representation, adding output alphabetical representation s from other rules within the rule set, as necessary. Additionally, where appropriate, a rule indicates where "additional" output alphabetical representation s may be placed in relation to the base, or root, output alphabetical representation in order to construct a complete output alphabetical representation. The formatting engine may operate in concert with various rule sets in order to effect various numerical-to-alphabetical translations. The translation engine may also comprise a parser which is connected to receive an alphabetical input string and to associate the alphabetical input string with a numerical output string having the same numerical value. The parser comprises a parsing engine and rule set and illustratively, the parsing engine may employ the same rule sets as employed by the formatting engine. After receiving an alphabetical representation representation of a number, the parser proceeds to match alphabetical characters in the string with alphabetical characters within the appropriate rule's base output alphabetical representation, and assigning the appropriate multiple of the rule's base value to the numerical output string. The parser proceeds in this manner, from rule to rule, until the input alphabetical character string is exhausted.

38 Claims, 12 Drawing Sheets

RULE-BASED NUMBER FORMATTER

FIELD OF THE INVENTION

The invention relates to the translation of numbers from one form of representation to another and, in particular, to the translation of a numerical representation of a number into an alphabetical representation, or from an alphabetical representation into a numerical representation.

BACKGROUND OF THE INVENTION

A variety of automated business applications would benefit from the translation of numerical representations of numbers to alphabetical representations having the same number value. Printing a check is one example of a computer system business application that employs both numerical representations of numbers, comprising numerical character strings, and alphabetical representations of numbers, comprising alphabetical character strings. Typically, a check's payable amount is printed on the check as a numerical character string, e.g., "$4,562.92"in the check's upper right hand corner. The payable amount is typically also "spelled out", e.g., "four thousand five hundred and sixty-two dollars and ninety-two cents" at another location on the face of the check. Since numbers are typically stored within a computer as a binary numerical representation, it is relatively easy to produce a number in numerical form for printing on a check. But a stored numerical representation must be translated into a human-readable form such as a natural language representation, which typically will take the form of an alphabetical representation, for printing of a check's "spelled out" value, and this translation is substantially more involved than the translation from an internal binary numerical representation to an external decimal numerical representation. There are a number of other business applications which require translation from a number's numerical character string representation to an alphabetical character string representation.

A number translation engine might also find more general application in speech synthesis and speech recognition applications. A number translation engine which translates numerical character strings into alphabetical character strings could be used within a speech synthesis system to provide an appropriate character string to a speech synthesis system's output sound system. For example, a speech synthesis system contained within a slot machine might announce to a gambler, and not insignificantly, to nearby gamblers, that the player has won "four thousand five hundred and sixty-two dollars". Without proper translation from numerical to alphabetical character strings, the announcement may sound something like "four five six two dollars", or even worse. As a result, a good deal of the drama, and advertising value, associated with the announcement would be lost.

A number translation engine may also be employed to translate alphabetical representations of numbers into numerical representations within a speech recognition system. For example, rather than requiring a user to enunciate numbers in an unnatural, awkward, fashion, e.g., "four five six two point nine two dollars" in a speech-input banking application, a number translation engine may allow a person to speak in a natural manner, indicating that they would like to deposit "four thousand five hundred and sixty-two dollars and ninety two cents".

Although number translators which transform a numerical representation of a number into an English language alphabetical representation exist, such translators do not accommodate a variety of languages, or even various representations, such as ordinal and cardinal representations, within a single language. The development of a number translator that can accommodate various languages faces significant obstacles. For example, it's not enough to modify an algorithm for English to read the literal string values from a resource file. English separates the component parts of a number with spaces; Italian and German do not. Furthermore, although the other digit positions are separated by spaces, English and French separate the ones and tens digits with a hyphen, Spanish uses "y," and many other languages either use a space or nothing. Some languages, such as Greek and Swedish, run the tens and one digits together into one word but put spaces between the others.

Some languages, such as Spanish and Italian, drop the word for "one" from the phrases "one hundred" or "one thousand." In Spanish, for example, "one thousand" is "mil," not uno mil." In some languages, such as German, the word for "one" in "one hundred" or "one thousand" is different from the word for "one" on its own: in German, "one" is eins," but "one thousand" is "eintausend," not "einstausend." In some languages, the word for "hundred" or "thousand" becomes plural when there's a number other than 1 in the hundreds place. In French, for example, 100 is "cent," but 200 is "deux cents." In some languages, the word for "hundred" or "thousand" also changes form depending on whether it's followed by more digits. 100 in Spanish is "cien," for example, but 101 is "ciento uno."

In most languages, the words for the values from 11 to 19 are based on the words for the values from 1 to 9, but are not simple concatenations. In English, for example, 15 is "fifteen" and not "fiveteen." This also happens for the words for the tens digits in most languages (twenty, instead of twoty, in English). In some languages, this also applies to other groups of words. In Spanish, for example, the tens and ones digits are usually joined by "y"; "thirty-one" is "treinta y uno." But the values from 21 to 29 contract the phrase down into a single word; instead of "veinte y uno," you say "veintiuno." So these values have to be special-cased. Worse, it still isn't a simple concatenation. Sometimes, the ones digit acquires an accent mark it doesn't have when standing alone: 22, for example, is "veintidós" instead of "veintidos."

In Spanish and Greek, canned strings are also required for the hundreds place. In Spanish, for example, you combine the words for 2 through 9 with "cientos," but word for the multiplier sometimes changes form in the contraction. 500, for example, is "quinientos," not "cincocientos." One might employ canned strings for the twenties and hundreds as well, even though most languages wouldn't need them.

There are additional peculiarities in various languages. In German, the ones digit goes before the tens digit: 23 is "dreiundzwanzig." In French and German, the combination of tens and ones digit is different if the ones digit is 1 than if it's something else: in German, 21 is "einundzwanzig" instead of "einsundzwanzig." In French, "et" goes before the ones digit only if it's 1; 21 is "vingt-et-un," but 22 is "vingt-deux." In Greek, the word for each tens digit has an accent mark that is eliminated when combined with a ones digit; 30 is "triánta," but 31 is "triantaéna." In Italian, when the tens digit ends with a vowel and the ones digit begins with a vowel, the tens digit loses its vowel: 50 is "cinquanta" and 52 is "cinquantadue," but 51 is cinquantuno."

Another area where permutations arise is in major groupings. For example, in American English and most European languages, large numbers are grouped by thousands (i.e., after a thousand, a new word is introduced every factor of 1,000). In British English, however, large numbers are grouped by million (a "billion" in British English is a "trillion" in American English; what we call a "billion" is called a "thousand million" in Britain). More importantly, in Japanese, large numbers are grouped by ten thousand, rather than by thousand.

French has a couple of peculiarities of its own: In European French, there are no words for 70, 80 or 90. The numbers from 70 up are rendered as "soixante-dix," "soixante et onze," "soixante-douze," "soixante-treize," and so on (literally, "sixty-ten," "sixty and eleven," "sixty-twelve, "sixty-thirteen," etc.) 80 is rendered as "quatre vingts" (literally, "four twenties"), and the numbers proceed by score from there (i.e., 81 is "quatre-vingt-un" ("four-twenty-one"), 90 is "quatre-vingt-dix" ("four-twenty-ten"), 91 is "quatre-vingt-onze" ("four-twenty-eleven") and so on). In addition, the numbers between 1,100 and 1,200 are rendered as "onze cents . . . " (literally, "eleven hundred . . . ") instead of "mille cent . . . " ("one thousand one hundred . . . ").

In short, the rules for translating numbers from numerical to alphabetical representations present a daunting array of obstacles to the formation of a single translation engine that is capable of accommodating various languages. Similar obstacles exist for the formation of a translation engine which translates numbers from alphabetical representations to numerical representations.

SUMMARY OF THE INVENTION

The foregoing need is satisfied in one embodiment of the present invention in which a number translation engine comprises a formatter, a parser, or both. The formatter and parser each comprise a rule set and, respectively, a formatting engine or parsing engine. The engines, parsing or formatting, employ a rule set to recursively construct output representations. That is, the rule set operates in conjunction with either a formatting engine or a parsing engine to provide, respectively, a translation from a numerical representation into an alphabetical representation or a translation from an alphabetical representation into a numerical representation. Given an input numerical representation of a number, the formatting engine recursively employs the rule set to construct an alphabetical representation. Given an alphabetical representation of a number, the parsing engine recursively employs the rule set to construct a numerical representation. In the illustrative embodiment, the formatting and parsing engines employ a common rule set and effect a bidirectional mapping between numerical and alphabetical representations. That is, a numerical representation constructed by the parsing engine will be translated into an alphabetical representation by the formatting engine which, if returned to the parsing engine, will be translated back into the original numerical representation.

The formatter comprises a formatting engine which associates a input numerical representation with an output alphabetical representation having the same numerical value, in effect, translating a input numerical representation into an output alphabetical representation. For example, the formatter may be employed to associate the output alphabetical representation "thirty-two" with the input numerical representation having the same numerical value, i.e., "32". The translation engine also comprises a rule list, with at least one rule list for each language supported. Each rule within a rule list includes a base output alphabetical representation and an indication to the formatting engine, either implicitly or explicitly, of a group of numerical values for which the rule applies. The formatting engine obtains a base output alphabetical representation, also referred to hereinafter as a "rule text", from an appropriate rule within a rule list. Additionally, where appropriate, a rule indicates where "additional" output alphabetical representations may be placed in relation to the base, or root, output alphabetical representation in order to construct a complete output alphabetical representation. The formatter builds up an output alphabetical representation, adding output alphabetical representations from other rules within the rule list, as necessary. For example, the rule which includes the base output alphabetical representation "thirty" may include an indication that an additional output alphabetical representation may be placed after "thirty", thereby allowing the addition of the output alphabetical representation "two" in the proper position to construct the final output alphabetical representation, "thirty-two".

The formatting engine may operate in concert with various rule lists in order to effect various numerical-to-alphabetical translations. For example, separate American English and British English rule lists may be employed with the formatting engine to allow translation from a input numerical representation to either an American English or British English output alphabetical representation, subject to a user's selection. Other rule lists may be employed for other languages or for other variations, such as ordinal and cardinal numbers. Negative numbers, fractions, and various radices are all accommodated by the translation engine.

The new number translation engine may also comprise a parser which is configured to receive an alphabetical input string and to associate the alphabetical input string with a numerical output string having the same numerical value. For example the parser could accept an alphabetical input string such as "thirty-two" and associate it with the numerical output string "32". The parser comprises a parsing engine and rule list and, illustratively, the parsing engine may employ the same rule lists as employed by the formatting engine. After receiving an alphabetical representation of a number, the parser proceeds to match alphabetical characters in the string with alphabetical characters within the appropriate rule's base output alphabetical representation, branching to other rules as necessary and adding their corresponding base values as appropriate. The parser proceeds in this manner, from rule to rule, until the input alphabetical character string is exhausted.

In addition to applications wherein character strings are displayed either in print or through electronic means, the new number translation engine is particularly suitable for application to speech recognition and speech synthesis systems. That is, the number translation engine's formatter may be employed in a speech synthesis system to translate an electronic representation of a input numerical representation into the corresponding spoken words. In such an application, rather than forming an oral output such as "three two", a synthesis system may form the oral output, "thirty-two". Similarly, the number translation engine's parser may be employed to recognize alphabetical representations, such as "thirty-two," and to associate the correct numerical character string with such a number's representation, without requiring that a number be spoken in an unnatural manner, e.g., without requiring a user to say "three two", rather than "thirty-two".

The new number translation engine may also be used to produce textual, non-word, representations of numbers. For example, the number translation engine may be employed to render numbers using numeration systems other than western ("Arabic") numerals, such as Japanese numerals, Roman numerals, or traditional Hebrew numerals. The number translation engine may also be used to separate a number into major and minor units, for example, to render a duration that is given in seconds as a duration given in hours, minutes, and seconds, or to render a dimension given in decimal feet, e.g., 4.5 feet, as a dimension given in feet and inches, e.g., four feet, six inches. The translation engine may also be used to list a measurement that has a changing dimension indication, e.g., to render "three meters" as "3 m", and "thirty thousand meters", as "30 km". Additionally, the number translation engine may be used to help format error and progress messages in a more grammatical manner. For example, "This operation will finish in 10 minutes", but "This operation will finish in one minute.", or "This operation will finish in less than one minute". The new number translation engine may be used to produce any of a wide variety of representations of a numeric value.

BRIEF DESCRIPTION OF THE DRAWINGS

The above and further advantages and aspects of the invention may be better understood by referring to the following description in conjunction with the accompanying drawings in which.

DETAILED DESCRIPTION

Figure 1:
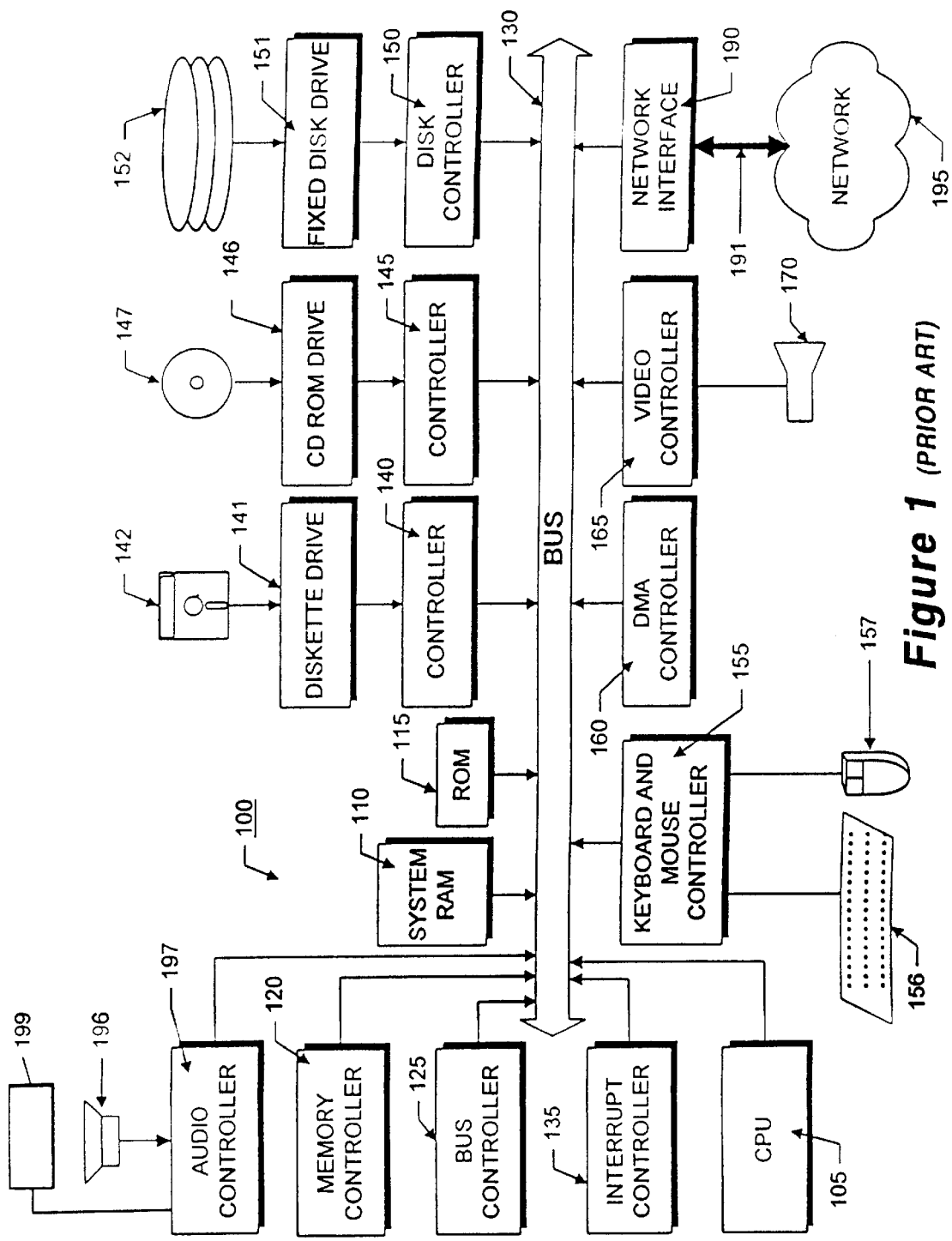
FIG. 1 is an illustrative block schematic diagram of a computer system on which the new number translation engine may be implemented.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as an IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is, in turn, connected to bus 130 by controller 145. Hard disc 152 is part of a fixed disc drive 151 which is connected to bus 130 by controller 150. DMA controller 160 is provided for performing direct memory access to RAM 110.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software. The operating system controls allocation of system resources and performs tasks such as process scheduling, memory management, networking, and I/O services, among other things. In particular, an operating system resident in system memory and running on CPU 105 coordinates the operation of the other elements of computer system 100. The present invention may be implemented with any number of commercially available operating systems including OS/2, UNIX and DOS,WINDOWS etc.

In the illustrative embodiment, the software elements of system are implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which act as templates that instruct the computer how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise, objects are destroyed by a special function called a destructor. Objects may be used by using their data and invoking their functions. When an object is created at runtime, memory is allotted and data structures are created.

The principal benefits of object-oriented programing techniques arise out of three basic principles; encapsulation, polymorphism and inheritance. More specifically, objects can be designed to hide, or encapsulate, all, or a portion of, their internal data structure and internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows functions which have the same name to perform the same conceptual operations on different kinds of data. For example, an addition function may be defined as variable A plus variable B (A+B) and this same format can be used whether the A and B are numbers, characters, or pictures. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common name (A+B) and, at runtime, the program will determine which of the three functions is actually called by examining the variable types. Polymorphism, like encapsulation, decreases the amount of information different parts of a program have to have about each other in order to operate properly.

The third principle which underlies object-oriented programming is inheritance, which allows program developers to easily reuse pre-existing objects and to avoid creating software from scratch. The principle of inheritance allows a software developer to declare classes (and the objects which are later created from them) as related. Specifically, classes may be designated as subclasses of other classes. A subclass "inherits" and has access to all of the public functions of its base classes just as if these functions appeared in the subclass. A subclass can override some or all of its inherited functions to behave in a way that is appropriate for, or modifies, an object instantiated from the subclass. The creation of a new subclass which has some of the functionality (with selective modification) of another class allows software developers to easily customize existing code to meet their particular needs.

The formatting and parsing engines employed by the number translation engine make use of a programming technique called recursion. Many, if not most, functions in a computer program rely on calling other functions to carry out part of their functions. When a function calls itself as it would call another function, it is said to be recursive. Recursion relies on the underlying operating system and hardware to keep track of more of the details of where a function is in the process of carrying out its duties. As an example of a recursive function, the following "C" function writes a character string to a user terminal in reverse order:

```
void reverse(char*s) {
    if(*S!=0) {
        reverse(s + 1);
        printf("%c", *s);
    }
}
```

This function calls itself to print all but the first character of the string and then prints the first character. The function will keep calling itself repeatedly until it reaches the end of the string (symbolized by 0) and then print the characters one by one from end to beginning as the recursive calls return.

Recursion is a programming technique that can make expressing a procedure in code simpler, but all recursive procedures can also be described with looping constructs. The fact that the formatting and parsing engines are descried herein using recursive techniques does not preclude the possibility of effecting them without using recursion.

Figure 2A:
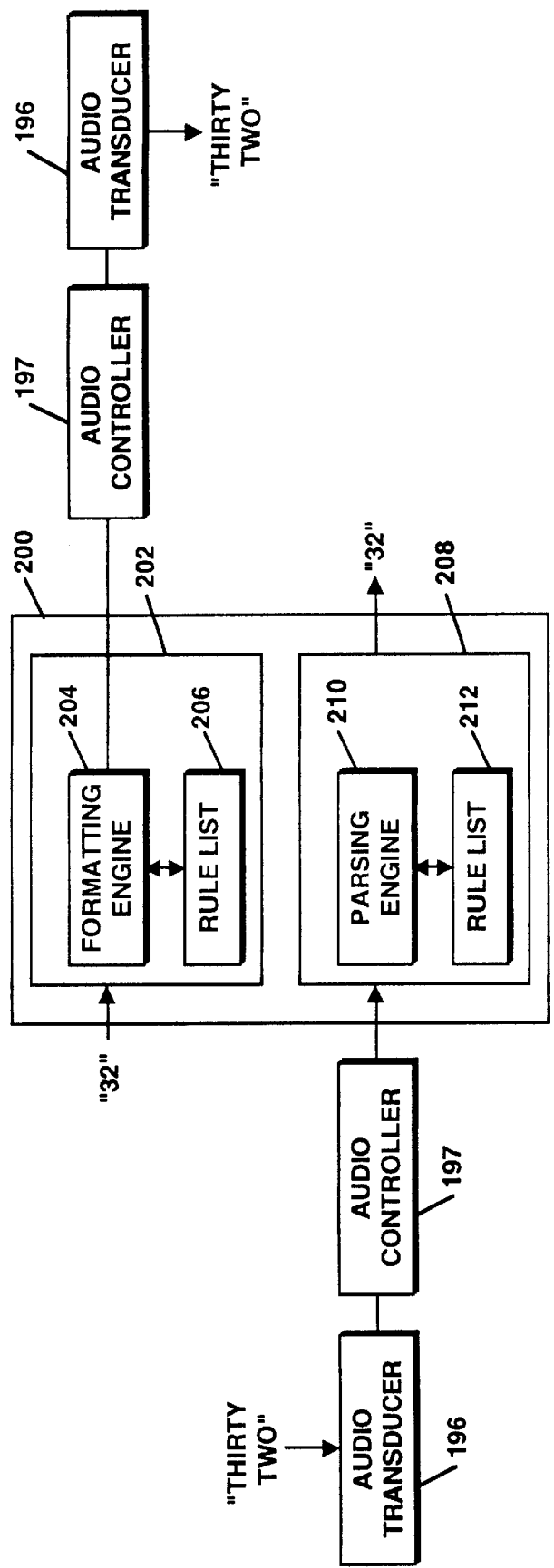
FIG. 2 is a conceptual block diagram of the new number translation engine.

In the illustrative block schematic diagram of FIG. 2, a number translation engine 200 comprises an output alphabetical representation formatter 202 which includes a formatting engine 204 and an ordered rule list 206. Each rule within a rule list 206 includes a base output alphabetical representation and an indication to the formatting engine 204, either implicitly or explicitly, of a range of numerical values for which the rule applies. Lower-order numbers, for example, the numbers ten and below, may be mapped from numerical input value to alphabetical output in their entirety in this manner. For example, the lower order rules for English may consist of output alphabetical representations "zero", "one", "two", etc., and the formatting engine would associate the input numerical representation "1" with the second rule in the rule list, a rule that includes the base output alphabetical representation "one". The string "one" would form the entire output string.

The number translation engine 200 comprises a formatter 202, a parser 208, or both. The formatter 202 and parser 208 each comprise a rule list 206 and, respectively, a formatting engine 204 or parsing engine 210. The engines, parsing or formatting, employ a rule list 206 (or 212) to recursively construct output representations. That is, a rule list 206 or 212 operates in conjunction with either a formatting engine or a parsing engine to provide, respectively, a translation from a numerical representation into an alphabetical representation or a translation from an alphabetical representation into a numerical representation. Given an input numerical representation of a number, the formatting engine 204 recursively employs the rule list 206 to construct an alphabetical representation. Given an alphabetical representation of a number, the parsing engine 210 recursively employs the rule list 212 to construct a numerical representation. In the illustrative embodiment, the formatting and parsing engines may employ a common rule list and effect a bidirectional mapping between numerical and alphabetical representations. That is, a numerical representation constructed by the parsing engine 210 will be translated into an alphabetical representation by the formatting engine 204 which, if returned to the parsing engine 210, will be translated back into the original numerical representation so long as rule lists 206 and 212 are the same.

Each set of alphabetical outputs—for example, a set associated with a particular language, a set associated with an ordinal number set, or a set associated with a cardinal number set—may have a rule list associated with it. As will be discussed in greater detail in relation to FIG. 3, each rule includes a base alphabetical character string (rule text), a base value (implicit or explicit) that indicates the lowest numerical value for which the rule applies, and, when appropriate, an indication (referred to as a substitution indicator or, more specifically, as a multiplier or modulus substitution) of where "additional" alphabetical representations may be placed in relation to the base output alphabetical representation. In the illustrative embodiment, each rule indicates to the formatter how it should treat a numerical character string whose corresponding numerical value falls within a range between the rule's base numerical value and the subsequent rule's base numerical value. Each rule within a rule list 206 includes a base output alphabetical representation and an indication to the formatting engine 204, either implicitly or explicitly, of a group of numerical values for which the rule applies. The formatting engine 204 obtains a rule text from an appropriate rule within a rule list. Where appropriate, a rule indicates where additional output alphabetical representations may be placed in relation to the current rule's rule text in order to construct a complete output alphabetical representation. The formatting engine 204 builds up an output alphabetical representation, adding output alphabetical representations from other rules within the rule list 206, as necessary, to the original rule's rule text, thereby associating numerical and alphabetical representations of a number having a given numerical value. In this manner, the formatter 202 constructs a natural language representation, e.g., "thirty-two" of a input numerical representation "32".

The formatting engine 204 obtains a base output alphabetical representation from an appropriate rule within a rule list 206 and builds up an output alphabetical representation, adding output alphabetical representations from other rules within the rule list 206, as necessary. Additionally, where appropriate, a rule within a rule list 206 indicates where "additional" output alphabetical representations may be placed in relation to the base, or root, output alphabetical representation in order to construct a complete output alphabetical representation. The formatter 202 may operate in conjunction with an audio controller 197 and audio transducer 196 to convert an electronic, numerical, representation of a number consisting of a numerical character string such as "32" into an audio, spoken representation of the same number, i.e., "thirty-two", as illustrated conceptually in FIG. 2. Illustratively, the rule within the ordered rule list 206 which includes the base output alphabetical representation "thirty" would include an indication, i.e., a "modulus substitution", that an additional output alphabetical representation may be placed after "thirty", thereby allowing the addition of the output alphabetical representation "two" in the proper position for the construction of the final output alphabetical representation, "thirty-two."

The new number translation engine 200 may also comprise a parser 208 which is connected to receive an alphabetical input string and to associate the alphabetical input string with a numerical output string having the same numerical value. The parser 208 comprises a parsing engine 210 and ordered rule list 212. The parsing engine 210 may employ the same rule list 206 as employed by the formatting engine 204. After receiving an alphabetical representation of a number, the parser 208 proceeds to match alphabetical characters in the string with alphabetical characters within the appropriate rule's rule text, branching to other rules as necessary, and adding their corresponding rule texts as appropriate. The parser 208 proceeds in this manner, from rule to rule, until the input alphabetical representation is exhausted. When used in conjunction with a speech recognition system, the pressure wave variations of spoken words, such as "thirty-two", would, illustratively, impinge upon an audio transducer 196 which would operate, along with an audio controller 197, to convert the audio input into an electronic representation of the alphabetical character string "thirty-two" for presentation to the parser 208. The parser 208 could then convert this alphabetical representation into a numerical representation "32", as illustrated. The number translation engine's parser 208 may be employed to recognize natural language alphabetical representations and to associate the correct numerical character string with such a representation. That is, it may be employed to recognize a spoken number without requiring that the number be spoken in an unnatural manner, e.g., without requiring a user to say "three two", rather than "thirty-two".

As noted above, the formatter 202 includes a formatting engine 204 which operates in conjunction with a rule list 206 to perform a numerical representation to alphabetical representation translation. In the illustrative embodiment, the rule list 206 is ordered to ease access to rules within the list. Operation of the formatting engine will be discussed in greater detail in relation to the flow chart of FIG. 4. The ordered rule list will be discussed in greater detail in relation to the illustrative class hierarchy diagram of FIG. 3 which is related to an object-oriented implementation of the translation engine. It should be noted, however, that the number translation engine needn't be implemented using object-oriented techniques, and, in a procedural language implementation, the object classes discussed herein can operate as regular data structures such as, for example, a Pascal RECORD or a C struct.

Briefly, each rule within a rule list may include a base value, a power of ten, a rule text, and a "substitution indicator". The rule's base value indicates the lowest numerical value for which the rule applies. For example, if a rule with a base value of 100 is followed in the list by a rule with a base value of 1,000, that rule will be used to format all values from 100 to 999 (with one exception to be described below in the discussion related to FIG. 4 steps 408 through 412).

A rule's power of ten may be derived from the rule's base value by taking the common logarithm of the rule's base value rounded down to the nearest integer (e.g. 100's power of 10 is 2, 20's power of 10 is 1, and 4's power of 10 is 0), but certain rules may define it to be less. For example, 0 doesn't have a common log, but its power of 10 is defined to be 0. The rule's base character string is employed by a formatter to "build up" a numerical representation's corresponding alphabetical representation. Each rule may include a substitution indicator which indicates to the formatting engine the proper location for the addition of alphabetical characters to the base alphabetical character string. A substitution indicator may be a "multiplier substitution" or a "modulus substitution". A multiplier substitution indicates that additional alphabetical characters may be placed in a position corresponding to the digit position to the left or right of rule's power of ten. For example, an English language rule may include a rule that has a base value of 100, base alphabetical character string of "hundred", and a multiplier substitution indicator "<<" located in front of the alphabetical character string, thus:"<<hundred". The multiplier substitution indicator in this example, "<<", indicates to the formatting engine that a number having a base value of 100 may have additional alphabetical characters, such as "one", "two", etc. placed in front of the alphabetical representation "hundred" to form a string, such as "two hundred". Similarly, a modulus substitution, "<<hundred>>" would let the formatting engine know that an alphabetical character string, such as "twenty", could be placed after the "hundred" string to form an output character string, such as "two hundred twenty", for example.

The alphabetical character string that the formatting engine uses for a multiplier substitution is the base alphabetical character string of the rule within the rule list that is determined, generally, by dividing the highest non-translated portion of the input numerical representation by the current rule's base value. For example, upon encountering a numerical representation 200 and using an American English rule list, the formatting engine would determine that the rule having a base value of 100 is the proper rule with which to begin the translation process. With a multiplier substitution indication, the formatter would divide 200 by 100 to obtain a number, "2". This value is the base value of a rule including the base alphabetical representation, "two", and the formatting engine would place this base alphabetical representation in front of the base alphabetical representation "hundred" to form the output alphabetical representation "two hundred". The modulus substitution value is obtained, generally, in a similar manner with the appropriate rule being determined by the remainder of the division of the input numerical representation by ten raised to the rule's power of ten, as just described.

Figure 2B:
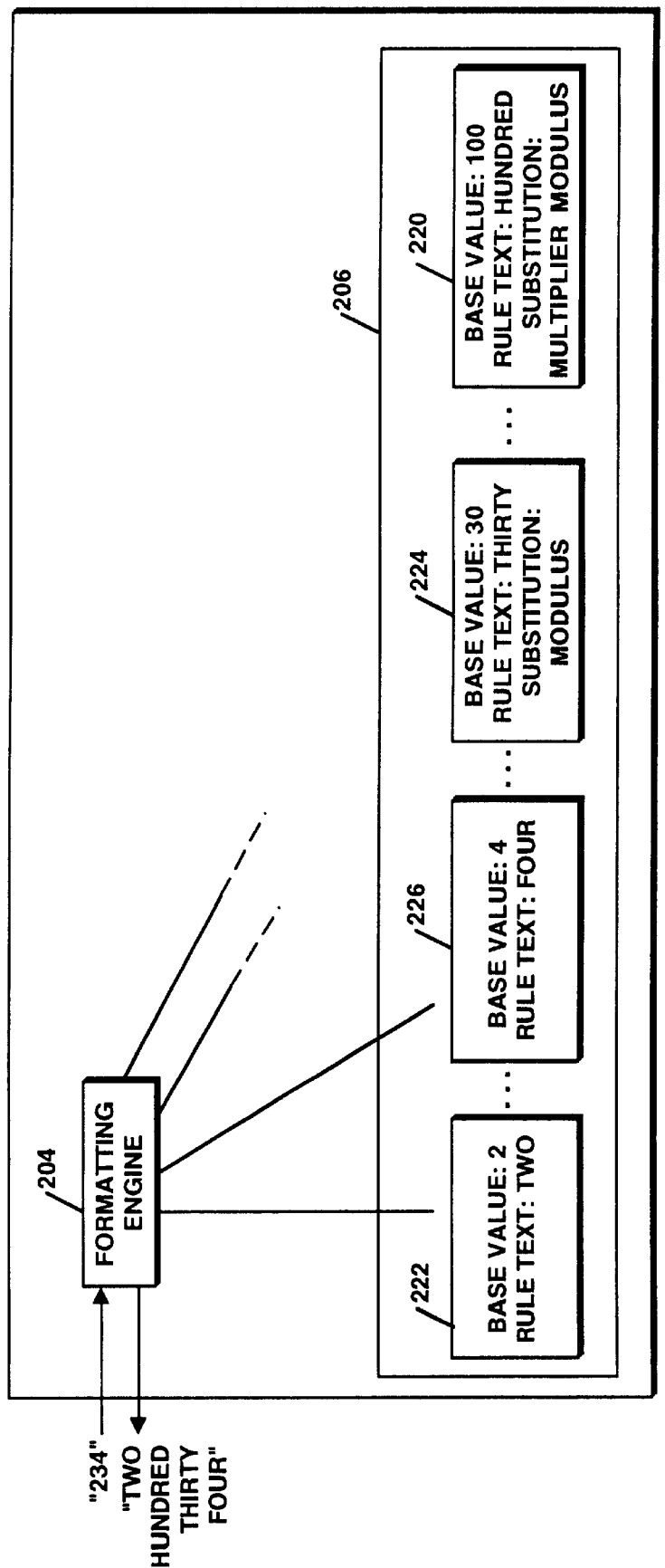

As another, more detailed example, consider a rule 220 of FIG. 2B with a base value of 100, a power of 10 of 2, base alphabetical character string, or "rule text", of "hundred", a multiplier substitution at the beginning of the rule text, and a modulus substitution at the end of the rule text. The next rule's base value is 1000. Rule 220 would apply to the value 234 (because rule 220 applies to every number from 100 to 999, since the next rule's base value is 1,000). The formatting engine 204 would start with the output string "hundred", the rule text of rule 220. The formatting engine would then divide 234 by 100 (ten raised to the power of 2) and use the result to determine the multiplier substitution text, e.g., the rule text of rule 222, "two", which would get inserted at the beginning of the result, yielding "two hundred". Then the formatting engine would take 234 modulo 100, yielding 34. The formatting engine would then employ "34" to determine the modulus substitution text by recursively producing the string "thirty-four" from rules 224 and 226. That is, the formatting engine would, since rule 224 has only a modulus substitution indicator, take 34 modulo 30, i.e., would divide 34 by 10 (ten raised to the power of 1) yielding a modulus substitution of "4". The rule text, "four", from the corresponding rule 226 would then be inserted in the alphabetical representation and, in this manner, the formatting engine 204 would then append "thirty-four" to the end of "hundred", yielding "two hundred thirty-four".

Multiplier and modulus substitutions will be discussed in greater detail in relation to FIGS. 3 and 4. Generally, the first twenty-one rules in a rule list are just the words for the numbers from zero to twenty with no substitutions. That is, the first twenty-one rules in a rule list consist entirely of the associated base alphabetical character string, or rule text.

Figure 3A:
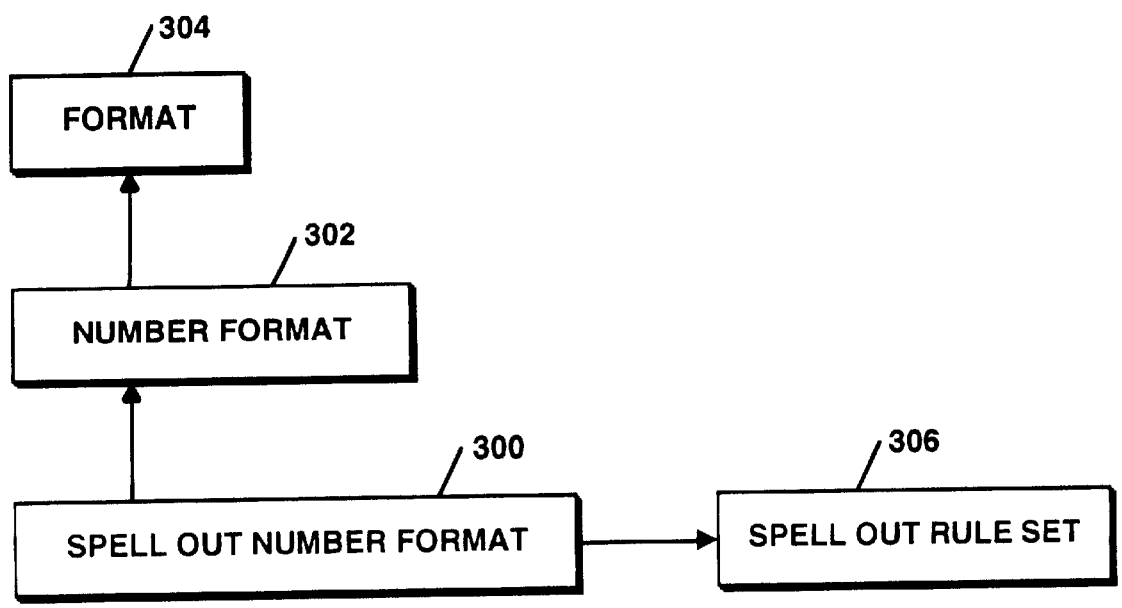
FIG. 3 is a block diagram of an object-oriented implementation of the new number translation engine, including a formatting engine object.

The class hierarchy diagram of FIG. 3A outlines the overall structure of an illustrative object oriented implementation of the new number translation engine 200. SpelloutNumberFormat class 300 is the basic class that performs the formatting and parsing. The SpelloutNumberFormat class 300 descends from a more general class, the NumberFormat class 302, which is an abstract class defining a protocol for formatting and parsing numerical values, i.e., converting numeric values to a textual representation and vice versa. The NumberFormat class, in turn, descends from an even more general abstract class called the Format class, which defines a general protocol for translating any data type to and from some kind of textual representation. A Spellout RuleSet class 306 represents a set of rules for formatting numbers. A SpelloutNumberFormat object, instantiated from SpelloutNumber Format class 300 may employ one or more SpelloutRuleSet objects (instantiated from SpelloutRuleSet class 306), with each different SpelloutRuleSet object being dedicated to a different language, for example. Additionally, the rules in one rule set may make use of another rule set "owned" by the same formatter. RuleSetList is a list of SpelloutRuleSet classes 306. Each SpelloutRuleSet class comprises a ruleList comprising objects instantiated from the SpelloutRule class 308.

Figure 3B:
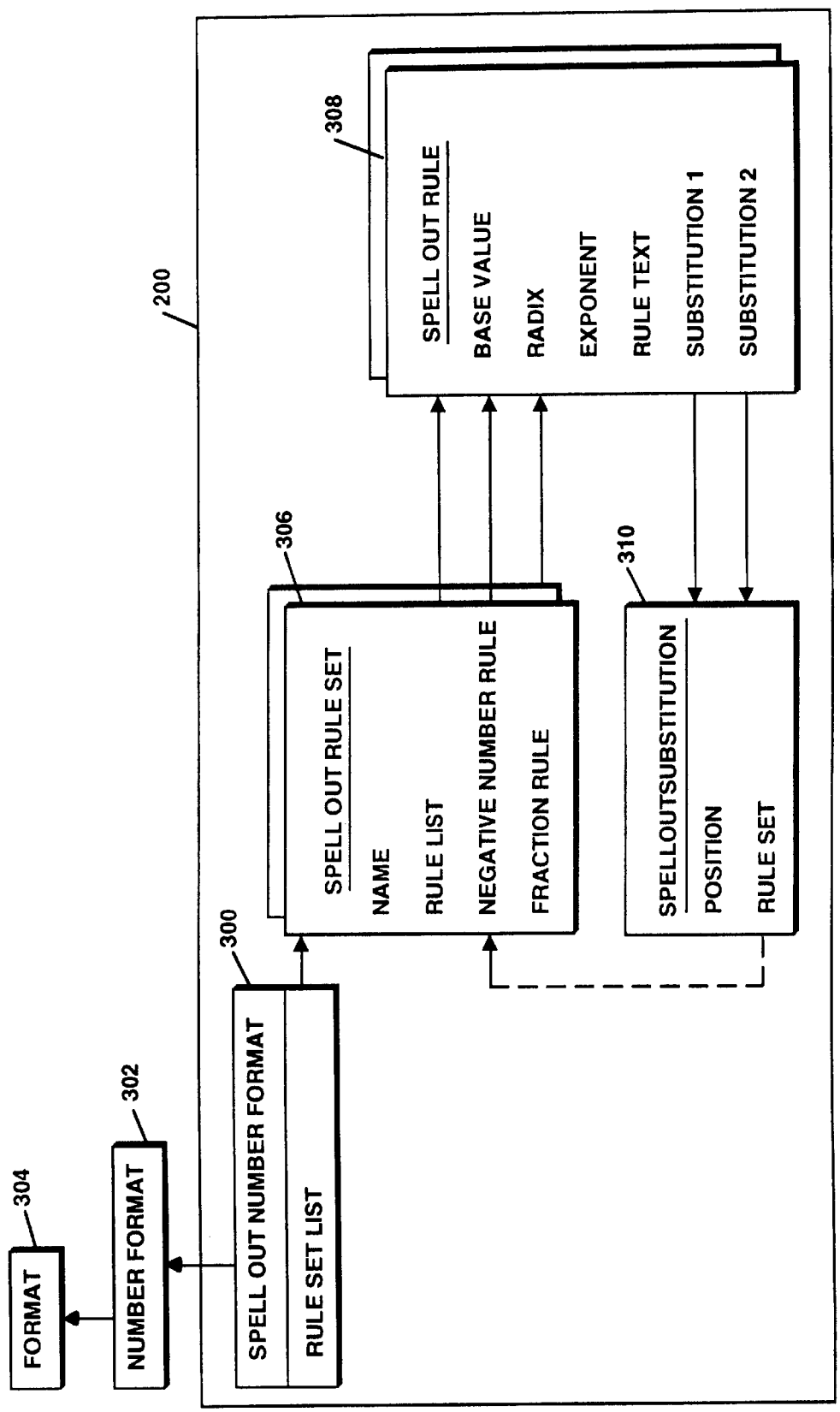

Turning now to FIG. 3B, an illustrative SpelloutRuleSet object instantiated from class 306 has the following attributes: a name, an ordered list of SpelloutRules (ruleList), a negative number rule and a fraction rule. Rule sets are available in two "flavors", depending on context: a "normal" rule set or a "fractional" rule set. The Spellout RuleSet class 306 attributes may, optionally, include a negative-number rule or a fraction rule. The SpelloutRuleSet name attribute may be used in an application programmer interface (API) to allow a caller to specify which rule set to use to format a particular number when the formatter provides rule set options. Each ordered list of SpelloutRules 308, as briefly discussed above, describes how to format numerical values. A "normal" rule set, which includes a list of "normal" SpellOutRules 308, is used for formatting integral number values. Fractional-part substitutions, which will be discussed in greater detail shortly, are employed by the formatting engine in conjunction with a fraction rule set to format the fraction parts of non-integral number values. A rule set is a fraction rule set if it is used by a fraction-part substitution. Negative-number and fraction rules describe how to format, respectively, negative numbers and non-integral values. The different "flavors" of SpellOutRuleSet, i.e., normal or fractional rule set, may be implemented as different classes in an object-oriented implementation, or may be identified by type flags or through context.

Each SpelloutRuleSet 306 includes a ruleList comprising references to a plurality of SpelloutRules 308. Each SpelloutRule 308 contains attributes which indicate to a formatting engine how a numerical character string should be formatted to produce an alphabetical character string representation of a number having the same value as the numerical character string. Each instance of SpelloutRule 308 has the following attributes: a base value, a radix, an exponent, rule text (also referred to as base alphabetical character string), and zero, one, or two substitution indicators. A substitution indicator, such as substitutions or substitution2, refers to a SpelloutSubstitution object 310 to indicate which rule is to be used in a substitution, with the position and ruleSet information of SpelloutSubstitution 310 indicating which SpelloutRuleSet 306 to employ.

The base value for each SpelloutRule 308 defines the range of values for which the rule is applicable. The meaning of the base value is context-dependent. If the rule is a component of a "normal", i.e., non-fraction, rule set, the base value is the lowest integral value for which the rule is applicable. The upper limit of the range of numerical values for which the rule is applicable is defined by the base value of the next rule in the ordered rule list, ruleList. The range for the last rule in a rule list has no upper bound. On the other hand, if the rule is not a component of a normal rule list, but instead occurs in a fraction rule list, the base value is interpreted as the fraction's denominator and the rule is applicable to a given input numerical representation if a multiplication of the input numerical representation 's corresponding numerical value by the rule's base value yields an integral result. Finally, if the rule is a SpelloutRuleSet's 306 negative-number rule or fraction rule, the base value is ignored.

As noted above, each rule's base alphabetical representation, or rule text, forms the base upon which an output alphabetical representation is built up, using substitutions, as required, to add alphabetical character strings where appropriate and rules from various lists may be combined. For example, assume the alphabetical character string "hundred" is the rule text associated with a rule having the base value 100 within a cardinal English SpelloutRuleSet's ruleList. This rule text, i.e., "hundred" may be combined, using a modulus substitution, with the rule text "twentieth" within another ruleList "owned by" the same SpelloutRuleSet 306, such as a ordinal English SpelloutRuleSet's ruleList, to form a output alphabetical character string "hundred twentieth". This result may, in turn, be combined with additional alphabetical character string using a multiplier substitution to produce a final alphabetical character string output, "three hundred twentieth".

Each rule's radix and exponent control the manner in which substitutions are carried out. Unless otherwise specified, all rules'radices are 10. Radices are discussed in greater detail in relation to substitutions immediately below and in relation to FIG. 4. A rule's exponent is, in general, equal to $[(\log_{radix} (\text{base value})]$, but a lower value may be specified by a user. That is, the exponent is generally calculated by taking the radix-based log of the rule's base value and truncating the result to the largest integral value lower than the log. For example, for a base value of 300 and a radix of 10, a rule's exponent would be 2, not 2.477. Since zero has no logs, the exponent for a rule whose base value is zero is specified as zero.

Returning to the subject of substitutions, each rule may include as many as two substitution indicators, each of which is an instance of SpelloutSubstitution 310. A SpelloutSubstitution 310 includes position and rule set information which enables a formatter to "add" rule texts from various rules in the proper sequence in order to build up an alphabetical character output string. A substitution performs some type of transformation on the value being formatted, uses a SpelloutRuleSet to format the transformed value, and places the result, i.e., rule text corresponding to the formatted transformed value, at a specified location in relation to the rule text of the rule that employs the substitution. Using SpelloutRuleSet to format the resulting value may, in turn, involve substitutions.

If the rule employing a substitution is a negative-number rule, only one type of substitution, an absolute-value substitution, is allowed. An absolute-value substitution employs a SpelloutRuleSet 306 associated with the SpelloutSubstitution 310 to format the absolute value of the numerical value corresponding to the numerical character string being formatted.

If the rule employing the substitution is a fraction rule, the substitution may be either an integral-part substitution or a fractional-part substitution. An integral-part substitution formats the integral part of the numerical character string being formatted using the substitution's corresponding ruleSet, indicated by SpelloutSubstitution 310. Similarly, a fractional-part substitution formats the fractional part of the numerical character string, using the fraction-part substitution's corresponding ruleSet, indicated by SpelloutSubstitution 310. A fraction-part substitution's rule set, i.e., a rule set used by a fractional-part substitution, is treated as a fraction rule set, not as normal rule set. The consequences of this treatment will be discussed in greater detail in relation to the flow chart of FIG. 4. A fractional-part substitution can also format a numerical representation digit-by-digit if no rule set is specified by the fractional substitution's corresponding SpelloutSubstitution 310. For example, 0.123 would be formatted as "one two three" if no rule set were specified by SpelloutSubstitution 310.

If the rule employing a substitution is a rule in a fraction rule list, that is, if the rule is used by a fractional-part substitution, only one type of substitution is allowed, and that is a numerator substitution. A numerator substitution multiplies the value, of the numerical representation being formatted by the "owning" rule's base value then formats the integral part of the result using the owning rule's rule set, which is treated as a normal rule set, not as a fractional rule set. As with different types of SpelloutRuleSet, different types of SpelloutSubstitution may be implemented as separate classes, with selector values, or inferred from context. The interplay of SpelloutRuleSets, SpelloutRules, substitutions, etc. will be better understood with reference to the flow chart of FIGS. 4 and 5 which describe in greater detail the new number translation engine's processes of formatting and parsing, respectively.

FORMATTER

Turning now to the flow chart of FIG. 4, the operation of the formatting engine 204 will be discussed in greater detail. The operation set forth in FIG. 4 is a relatively simple exposition of the operation of the formatting engine 204; extensions to the basic operation are set forth in greater detail following the discussion related to FIG. 4.

Assume a function called format accepts a rule list and numerical representation of a number and returns an alphabetical representation of the number having the same value as the numerical representation. Although, in general a formatter may include a plurality of rule sets, the discussion of the flow chart will, for now, be limited to a formatter that has a single rule set, accepts only non-negative integers all rules within the rule list have a radix of 10, and each rule can have only multiplier and modulus substitutions.

The process begins in step 400 and proceeds to step 402, where a number n, in its internal representation received by the format function. From step 402, the process proceeds to step 404, where format searches the rule set for the appropriate rule and assigns the variable rule the corresponding rule location information, which may be an address offset that points to the location of the rule of interest within a ruleList, for example. For the sake of clarity, attributes and characteristics of the rule referenced by the variable rule will be referred to hereinafter as rule's attribute or characteristic. For example; "p10 is assigned the value of 10 raised to rule's exponent", rather than, "p10 is assigned the value of 10 raised to the power of the rule referenced by rule's exponent." In this illustrative example, format would search base values of rules within the ordered rule set to determine which rule has a base value that is less than or equal to the value of the number represented by the numerical representation and whose immediately subsequent rule's base value is greater than the value of the number.

From step 404, the process proceeds to step 406 where variable p10 is assigned the value of 10 raised to rule's exponent. From step 406 the process proceeds to step 408, where format determines whether rule contains both multiplier and modulus substitutions. If rule contains both multiplier and modulus substitutions, the process proceeds to step 410, where n is divided by p10 and the remainder is checked to determine whether it is equal to zero. If the remainder is zero, the process proceeds to step 412, where rule is updated to reference the previous rule in the rule set and p10 is assigned the value of 10 raised to the latter rule's exponent value.

From step 412, the process proceeds to step 414, where the alphabetical character string variable result is set equal to rule's rule text. Step 414 is also reached if, in step 408 it is determined that rule does not have multiplier and modulus substitutions or, in step 410, it is determined that n mod p10 is not equal to zero.

From step 414, the process proceeds to step 416 where format determines whether rule has a multiplier substitution. If rule has a multiplier substitution, the process proceeds to step 418 where format divides n by p10 and truncates the result to an integer value. At this point the truncated result, t, is passed to format along with the formatting engine in step 419. In step 420, an alphabetical character string, the result of the format call of step 418, is inserted into result in the location indicated by the multiplier substitution's substitution position indicator.

After addressing the multiplier substitution in this manner, the process proceeds from step 420 to step 422 as the process would have, had it been determined in step 416 that rule has no multiplier substitution. In step 422 the process determines whether rule has a modulus substitution. If rule has a modulus substitution, the process proceeds to step 424 where format divides n by p10 and the remainder R is passed, along with the formatting engine to the function format in step 425. In step 426 the result of the format call is inserted into result in the location indicated by the modulus substitution's position indicator.

Following step 426, the process proceeds to step 428, as it will if it is determined in step 422 that rule has no modulus substitution. In step 428 the alphabetical character string in result is returned and the process finishes in step 430.

Figure 4:
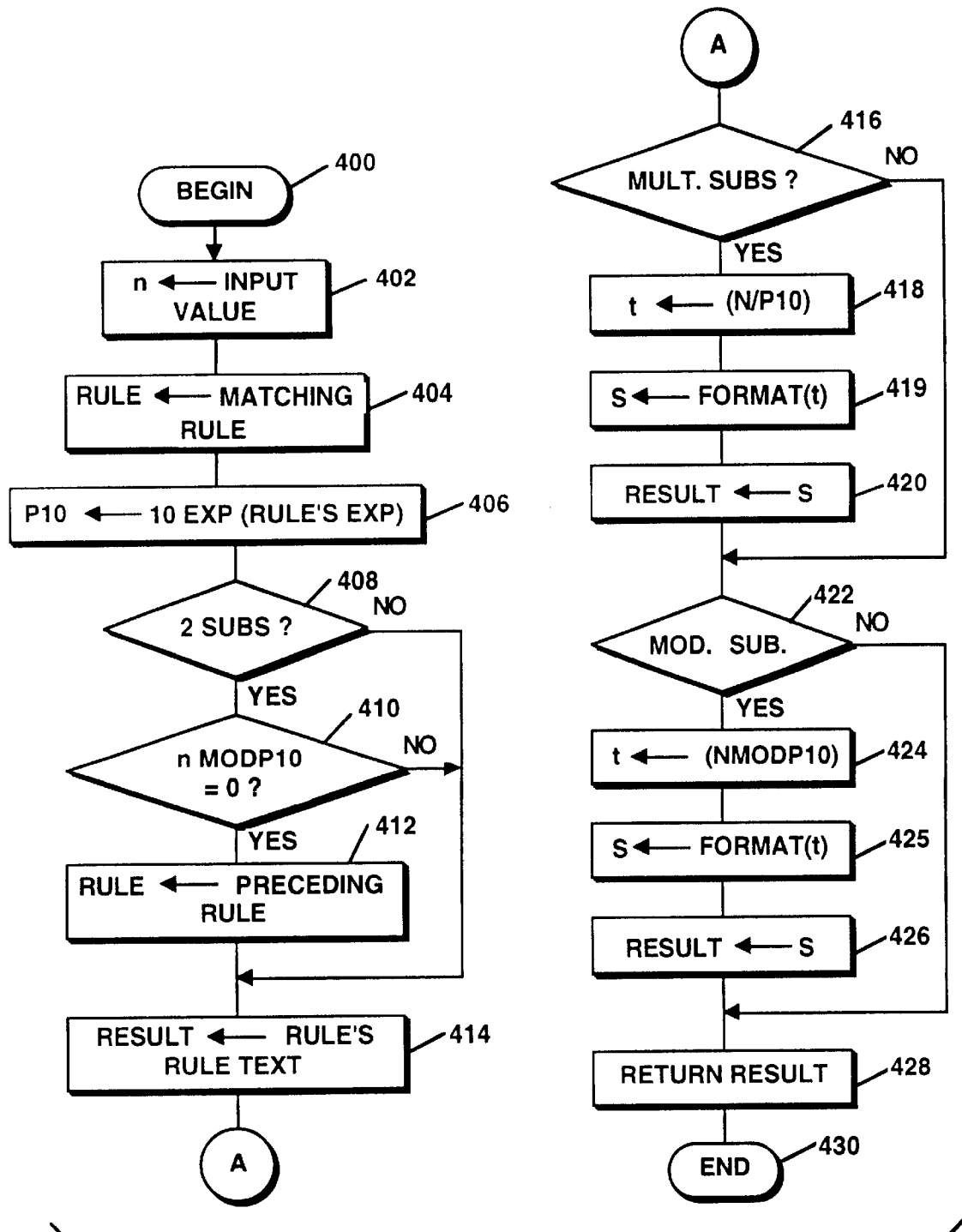
FIG. 4 is a flow chart of an illustrative embodiment of a formatting engine such as the new number translation engine may comprise.

Generally, the formatting process may be executed by employing a routine, such as that of the flow chart of FIG. 4, which searches an ordered rule list for a rule having the appropriate base value and copying the rule's base alphabetical character string, or rule text, into an output alphabetical representation. Illustratively, numbers are processed in descending order from the most significant to least significant digit of the number being processed. Additional characters may be added, as needed, by returning to the routine until all the number's component digits have been processed in descending order. The searching and copying may be accomplished, for lower order numbers, by creating individual rules for lower order numbers, for example, zero through ten, so that, for these lower order numbers, the routine acts essentially as a table lookup routine. Should a number not lie within the range of lower-order numbers, efficient search techniques, such as a binary search, may be performed to locate the appropriate rule.

Additional functionality, such as accommodation of negative numbers and multiple rule sets, may be supported by the function format. Because a flow chart depicting the process may prove to be so complex as to hinder, rather than enhance, understanding, an illustrative embodiment of a more complete formatting engine is set forth in the enumerated steps which follow. The formatter includes a formatting function format that is responsible for formatting a value to produce a string. This function takes the following values as input:

The value to format. Call this n.
A formatter. Call it f.
The name of a rule set to use. Call this rule-set-name. OR a reference to the rule set to use. Call this rules.

and returns a character string containing the formatted value. This function follows the following steps:

1. If the user specified rules, go to step 3.
2. Otherwise, search f for a rule set whose name is equal to rule-set-name. If one is not found, signal an error and return. Otherwise, let rules refer to the rule set that was found.
3. Is n negative? If so, let rule be rules's negative-number rule and go to step 11. If rules doesn't have a negative-number rule, set n to n's absolute value and continue to step 4.
4. Is n an integer? If not, let rule be rules's fraction rule and go to step 11. If rules doesn't have a fraction rule, set n to n's integral part and continue to step 5.
5. Search rules for an appropriate rule for formatting n. This search will take one of the following two forms:
   If rules is a normal rule set, set rule to the rule with the highest base value in rules that is less than or equal to n.
   If rules is a fraction rule set, iterate through the rules in order by base value. Set rule to be the first rule whose base value, when multiplied by n, yields an integer. If no rule in the list satisfies this requirement, set rule to the last rule in rules.
6. If rules is a fraction rule set, go to step 11.
7. Let divisor be rule's radix raised to the power of its exponent.
8. Does rule contain both a multiplier and a modulus substitution? If not, go to step 11.
9. Divide n by divisor Was the result 0? If not, go to step 11.
10. Set rule equal to the rule that precedes rule in rules and recalculate divisor based on the new rule. 11. Let result be a copy of rule's rule text.
12. Does rule contain any substitutions? If not, go to step 19.
13. Let sub be the last substitution in rule.
14. Let t be a value calculated from n based on sub's type as follows:
   If sub is a multiplier substitution, let t be n divided by divisor, truncated to an integer.
   If sub is a modulus substitution, divide n by divisor, and let t be the remainder.
   If sub is a same-value substitution, set t equal to n.
   If sub is an absolute-value substitution, let t be the absolute value of n.
   If sub is an integral-part substitution, let t be n's integral part.
   If sub is a fractional-part substitution, let t be n's fractional part.
   If sub is a numerator substitution, multiply n by rule's base value, and let t be the integral part of the result.
15. If sub doesn't specify a rule set, format t using a sprintf( ) function or some similar utility that formats a number as digits, and insert the result into result at sub's substitution position.
16. If sub is a fractional-part substitution and specifies the rule set that owns it as the rule set to use, do the following:
   16a. Create a temporary string s.
   16b. Multiply t by rule's radix, let u be the integral part of the result, and set t to the fractional part of the result. If u is 0, go to step 16e.

16c. Format u using format, specifying f's default rule set. Append the result to the end of s.

16d. Go back to step 16b.

16e. Insert s into result at sub's substitution position.

17. Otherwise, format t using format, specifying sub's rule set as the rule set to use. Insert the result into result at sub's substitution position.

18. If rule contains two substitutions, let sub be the first substitution in rule, and repeat steps 14–17.

19. Return result.

PARSER

Figure 5:
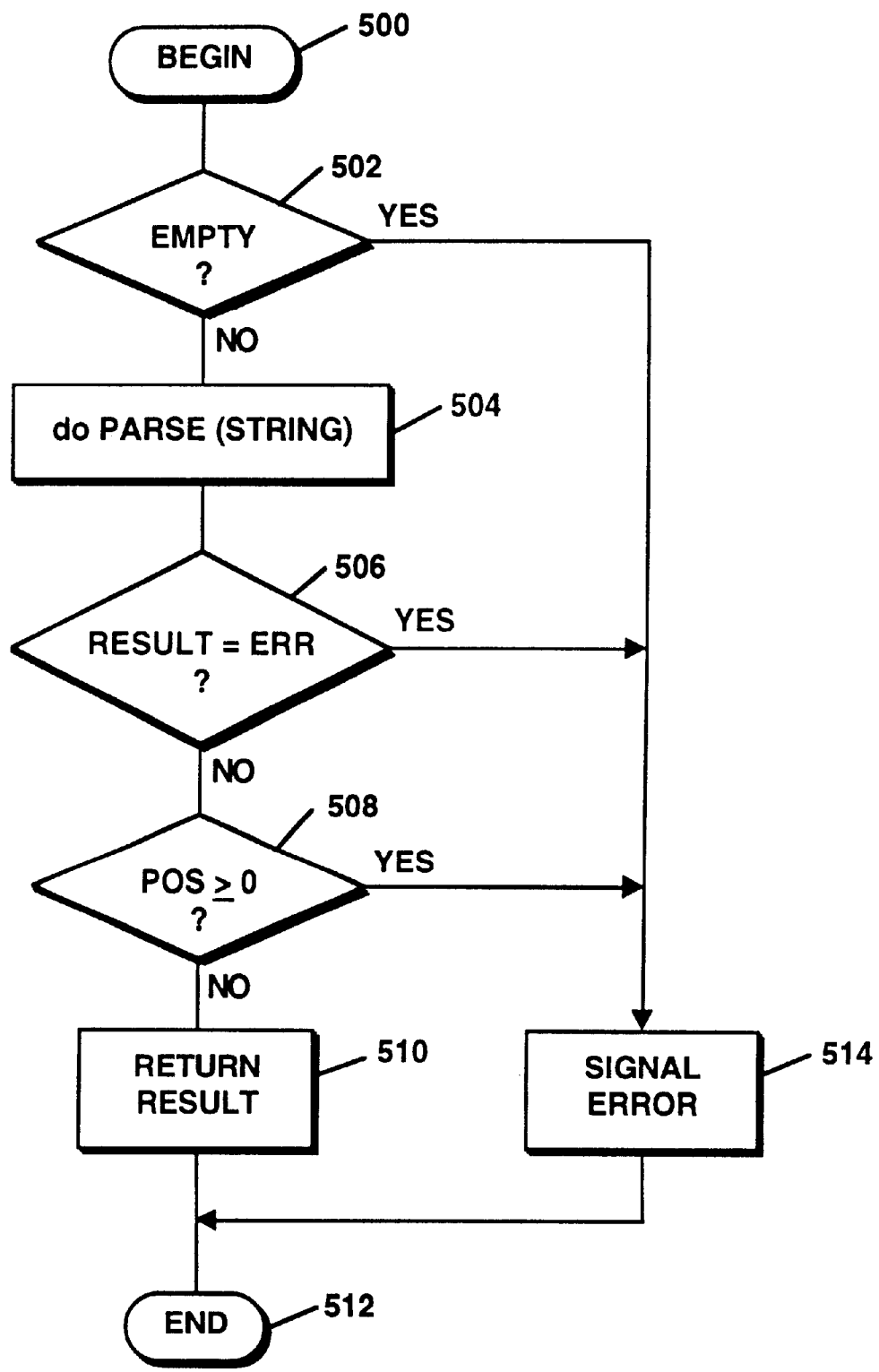
FIG. 5 is a flow chart of an illustrative embodiment of an error-checking function which may be employed in conjunction with a parsing engine such as the new number translation engine may comprise.
Figure 6A:
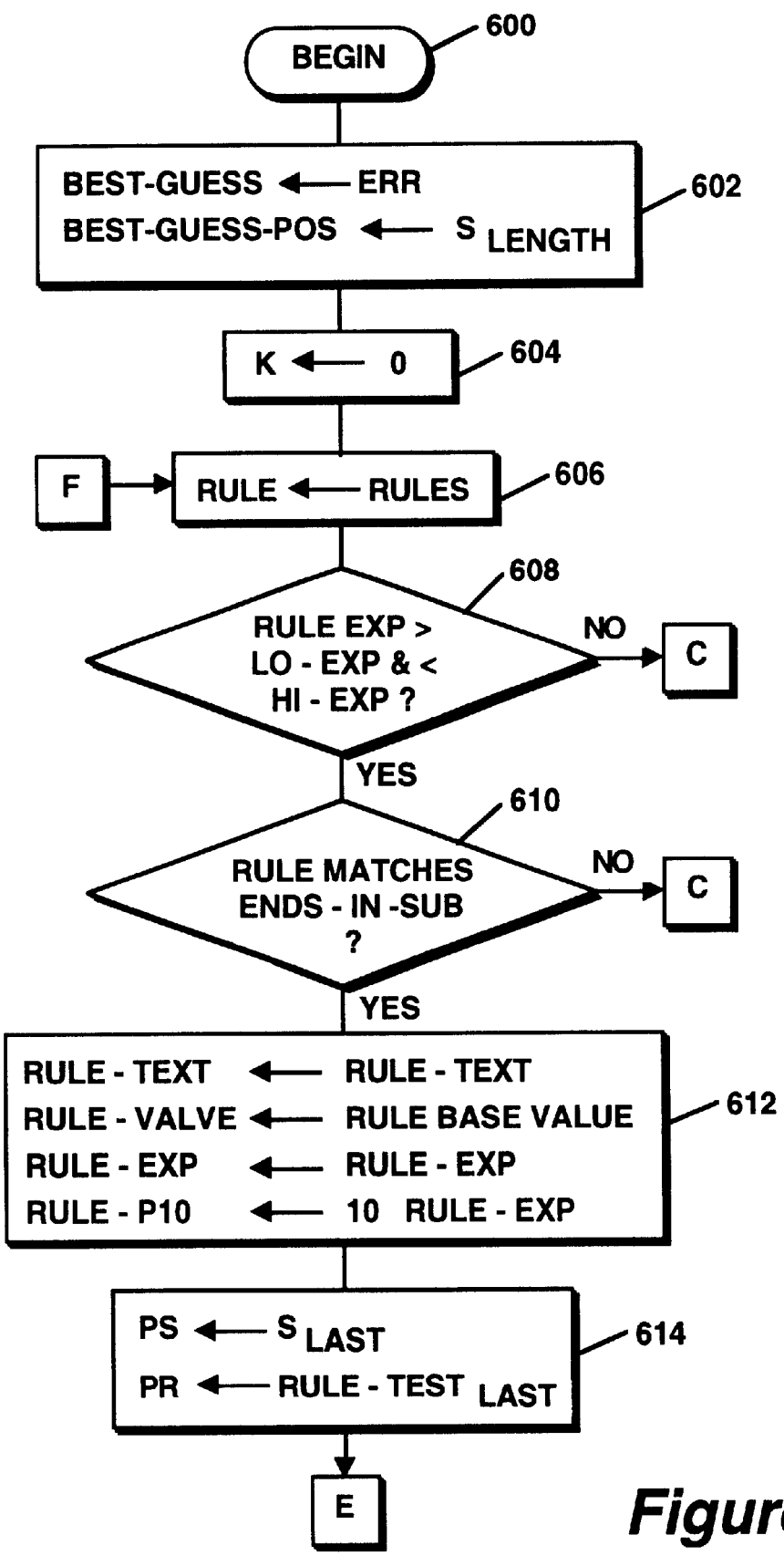
FIG. 6 is a flow chart which illustrates the operation of a function which executes the details of an illustrative number parser.
Figure 6B:
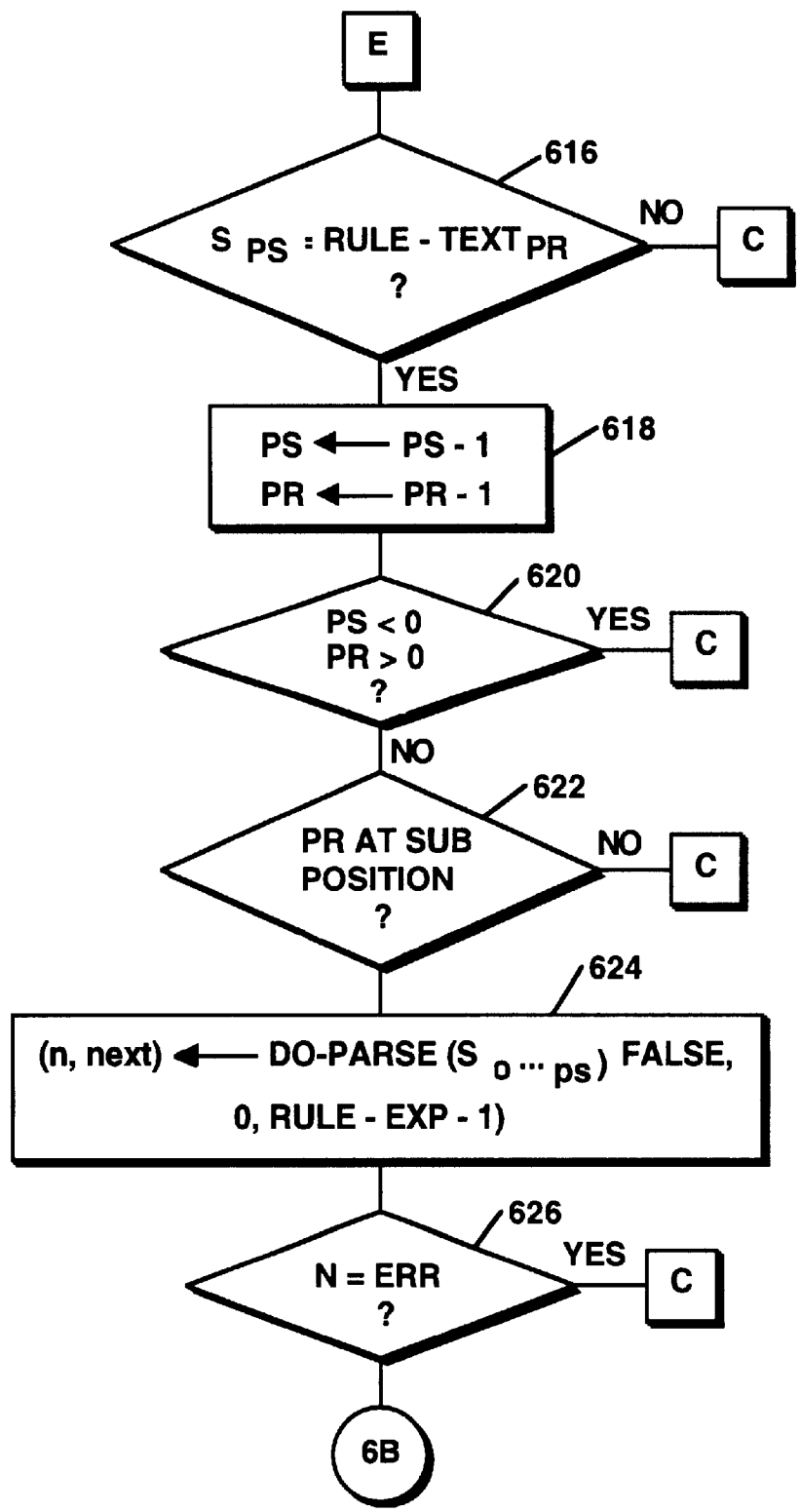
Figure 6C:
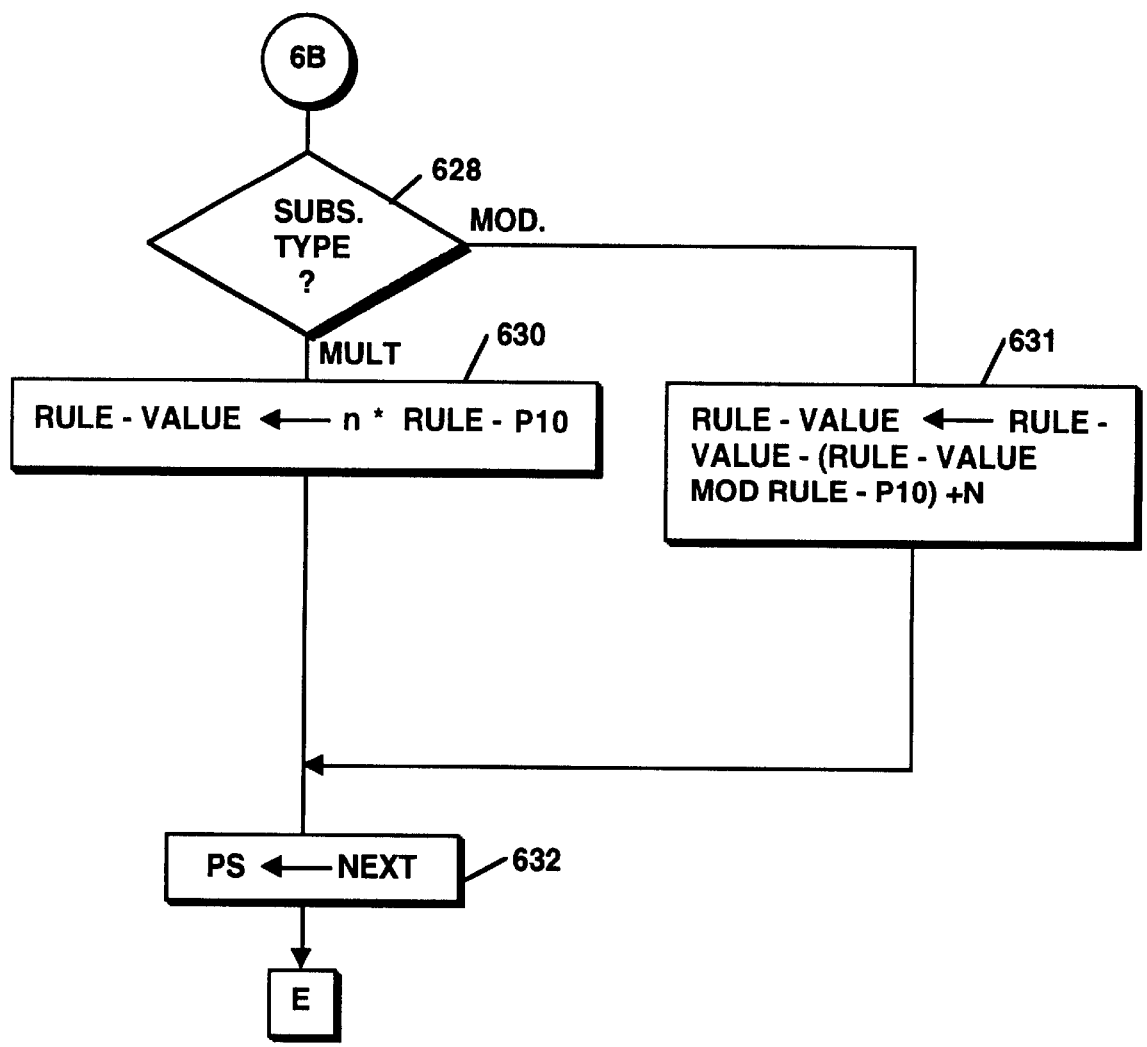
Figure 6D:
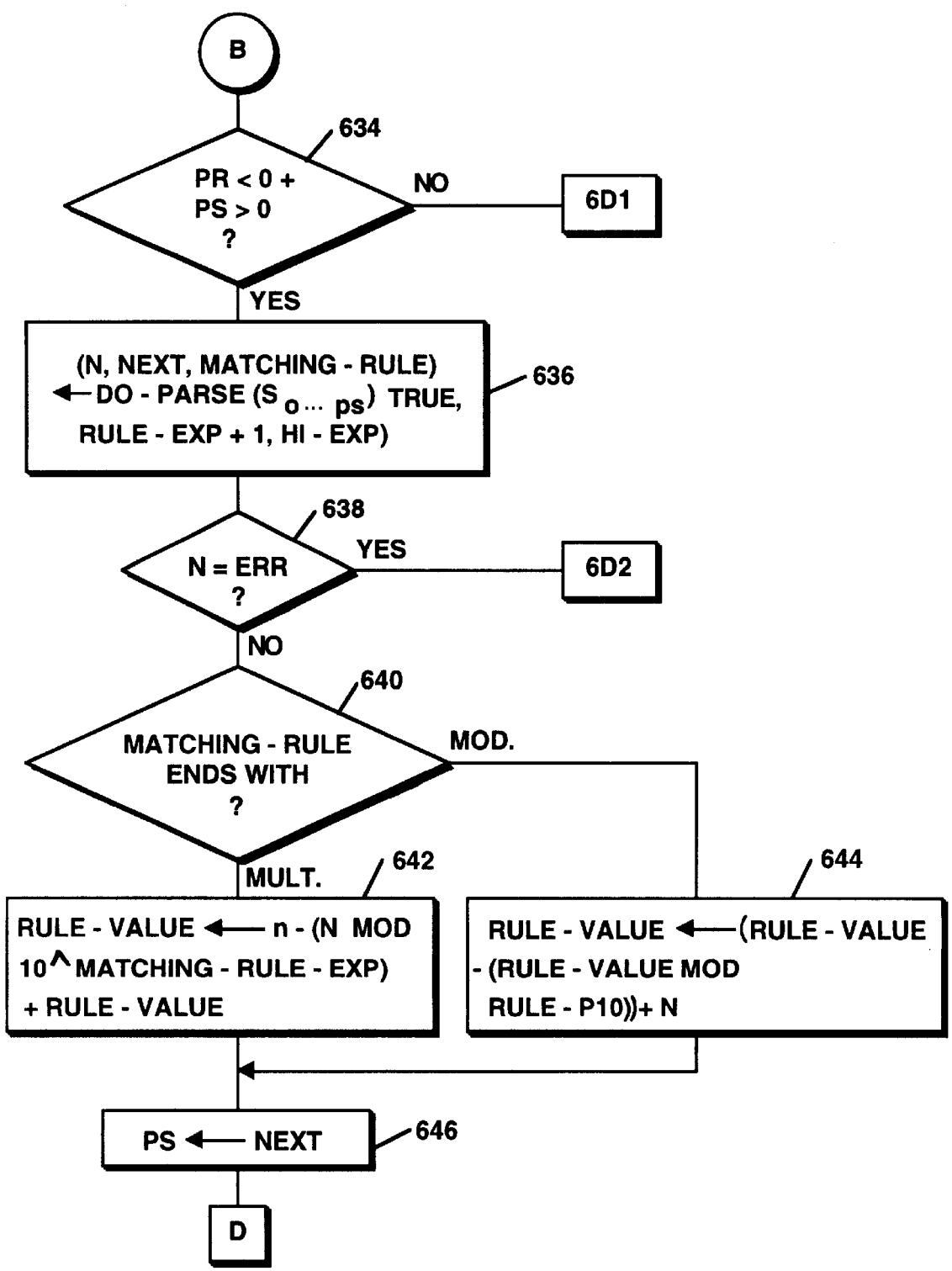
Figure 6E:
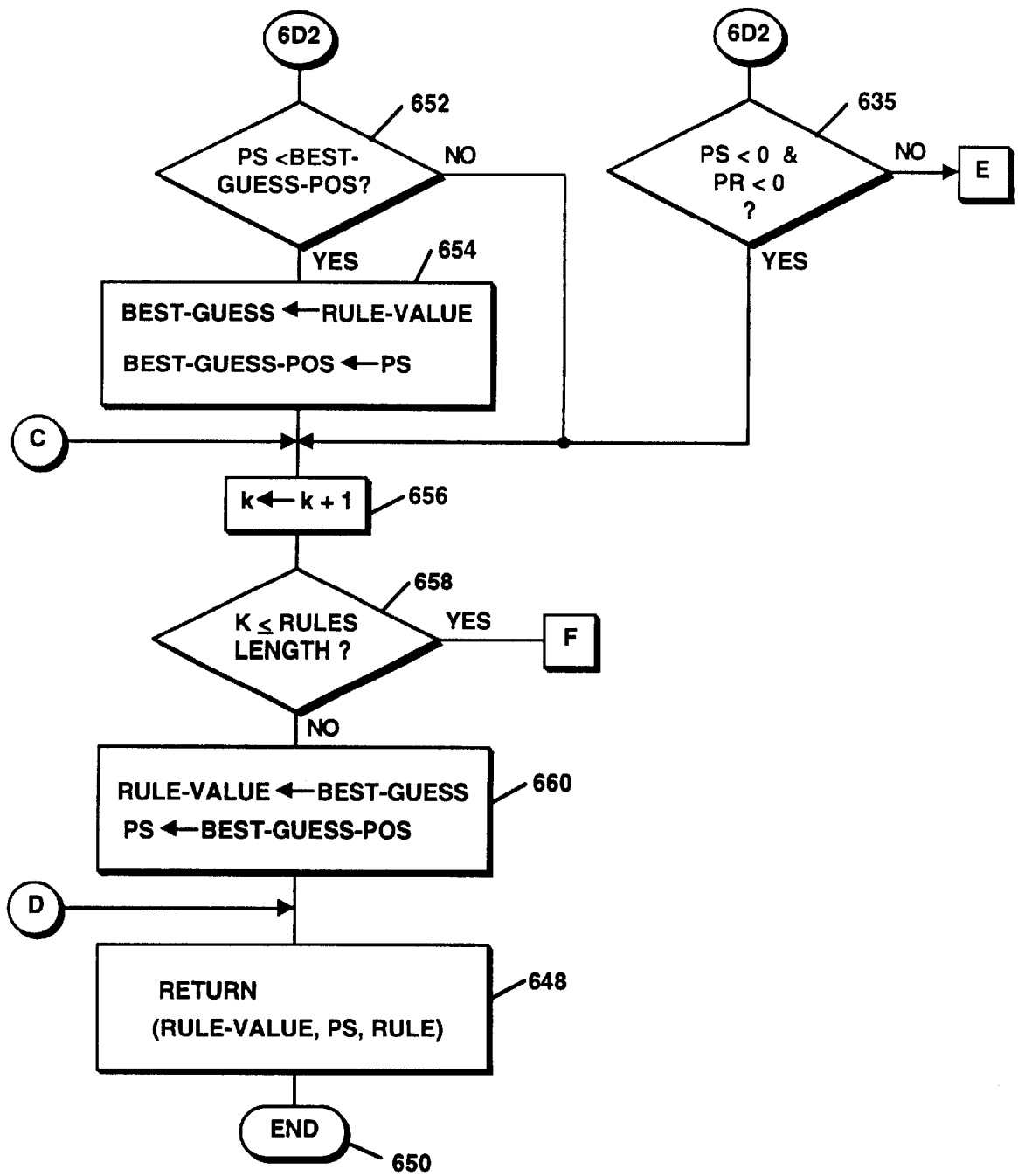

The number translation engine's parser 208 may be better understood with reference to the simplified flow chart of FIG. 5. For the sake of clarity a more detailed description of the parser is set forth in enumerated steps that follow the discussion related to FIG. 5. In the illustrative embodiment a function called parse is responsible for parsing an alphabetical character string representation of a number and producing a numerical character string representation of the same number as an output. The parse function accepts the alphabetical character string and a formatting engine as inputs and in addition to producing a numerical output string, provides an error signal to a caller, where appropriate.

Another function, do-parse, handles the details of the parsing. The function do-parse accepts: a string, s, that is to be parsed; a flag, end-in-sub?, that indicates to the parser whether to consider only rules ending in substitutions or to consider only rules not ending in substitutions; a formatter; and a range, from lo-exp to high-exp, of acceptable exponent values for the rules that do-parse may consider. The function do-parse returns: a numerical representation, n, a character offset, next-char, of the first character in the string not consumed by the call to do-parse; and a reference, matching-rule, to the rule that ultimately matches, if one does.

For purposes of this limited illustrative description of the new parser, it is assumed that the alphabetical input strings that are to be parsed have been created in conformity with the format function described in relation to FIG. 4. Consequently, only non-negative integers will be produced by the parser, and the parser will operate with only a single rule set that contains rules with only multiplier and modulus substitutions and with only radices of 10. A constant value, err, is used as a sentinel to represent an error.

The function parse begins in step 500 and proceeds to step 502 where parse determines whether the string submitted for formatting is empty. If the string is not empty, the process proceeds to step 504, where parse calls the function do-parse, passing the input string and formatting engine. The flag ends-in-sub? is set false, indicating that the parser should only consider rules that do not end in a substitution. The variables lo-exp and hi-exp are set to delimit an arbitrarily wide range. The function do-parse returns a value n which is the numerical representation resulting from the parse. In step 506 parse determines whether do-parse has set n equal to the constant err, thereby indicating that an error occurred during the parsing process carried out by do-parse. If no error is indicated in step 506 the process proceeds to step 508, where parse examines the value of next-char to determine whether parse has returned a non-negative value for this variable. If next-char is negative all the characters in the input string have been parsed and the process proceeds to step 510, where the numerical representation result, returned by do-parse, is returned to the caller of parse. From step 510 the process proceeds to finish in step 512. If, in step 502, it was determined that the string was empty, or in step 506 the value of result was equal to the err value, or in step 508 next-char indicates that do-parse has not parsed the entire character string, the process proceeds to step 514, where an error is signaled to the caller of parse. From step 514 the process proceeds to finish in step 512.

The function do-parse may be better understood with reference to the illustrative flow chart of FIG. 6 where do-parse begins in step 600 then proceeds to step 602 where a variable best-guess that holds a best guess result value is set equal to err and a string position variable, best-guess-pos, that is intended to indicate the first character not consumed by the best guess result, is initialized to be equal to the character offset of the last character within the string s that is to be parsed. From step 602, the process proceeds to step 604 where a variable, k, that provides an offset into a set of rules used by the parser, is initialized to be equal to zero (assuming the first rule within rules is at the "zeroth" location).

In step 606, the value of rule, which indicates the rule within the rule set rules that is currently being employed in the parsing process, is set equal to rulek, thereby setting rule to the kth rule in the rule set rules. The process then proceeds to step 608, where the exponent of the current rule, rule, is checked to determine whether the exponent is within the range delimited by lo-exp and hi-exp. As will be described in greater detail below, if the exponent of rule is out of the lo-exp, hi-exp range, the process proceeds to step 656 where, briefly, rule is updated to the next rule within the rule set. If the exponent of rule is within the range set forth by lo-exp/hi-exp, the process proceeds from step 608 to step 610 where it is determined whether the value of ends-in-sub? matches the substitution condition of rule. That is, if ends-in-sub? indicates that only rules that end in a substitution are to be used and rule ends in a substitution, or if ends-in-sub? indicates that only rules that do not end in a substitution are to be used and rule does not end in a substitution, there is a match and the process proceeds to step 612. If there is not a match, the process proceeds, as in step 608, to step 656 where rule is updated to the next rule within the rule set.

In step 612, rule's rule text, base value, and exponent value are copied into rule-text, rule-value, and rule-exp, respectively. Additionally, rule-p10 is set equal to 10 raised to the power of rule-exp. From step 612 the process proceeds to step 614 where the variable ps is set equal to the offset of the last character in the string S and pr is set equal to the offset of the last character in rule-text. The process proceeds from step 614 to step 616, where do-parse determines whether the character within the character string s located at the offset ps matches the character located within rule-text at the offset pr. If the characters do not match, the process proceeds, as in steps 608 and 612 to step 656 where rule is updated to the next rule within the rule set. On the other hand, if the characters do match, the process proceeds to step 618, where ps and pr are decremented and, from step 618, to step 620 where do-parse determines whether ps is negative and pr is non-negative. If both conditions are met, that is, if all the characters within the string have been used up without using up all the characters within the rule text, there is a mismatch and the process proceeds to step 656 where rule is updated to the next rule within the rule set.

If both conditions are not met, the process proceeds to step 622 where do-parse determines whether pr points to a position within rule that has a substitution indicator. If pr does not point to a position within rule that has a substitution indicator, the process proceeds from step 622 to step 634 where, briefly, parsing continues. Details of the process related to step 634 are described in greater detail below. If pr does point to a position within rule that has a substitution indicator, the process proceeds to step 624 where do-parse is called, with the substring of s running from its first character to the character pointed to by ps is passed to do-parse as the string s. ends-in-sub? is set false, lo-exp is set equal to zero, and hi-exp is set equal to (rule-exp)−1. The value returned for matching-rule is ignored.

From step 624 the process proceeds to step 626 where it is determined whether n=err, that is, whether do-parse returned an error. If n=err, the process proceeds to step 656 where rule is updated to the next rule within the rule set. If do-parse did not return an error, the process proceeds from step 626 to step 618, where the substitution type is determined. If the substitution is a multiplier type, the process proceeds to step 630 where rule-value is set equal to the product of n and rule-p10. If the substitution is a modulus substitution, the process proceeds from step 628 to step 631 where rule-value is set equal to n+(rule-value−(rule-value modulo rule-p10)), that is, the value corresponding to the rule's value except for that portion of the rule "to the right of" the rule's power of ten. Following either step 630 or step 631, the process proceeds to step 632, where ps is set equal to the value do-parse returned for next-char. The process then returns to step 616 and proceeds from there as previously described.

As noted above, the process may proceed from step 622 to step 634. In step 634 it is determined whether pr is negative and ps is non-negative, indicating that all the text within the rule has been used up, but not all the text within the input representation and process proceeds to search for a rule that ends in a substitution since the present text could be substitution text for another rule. If both conditions are not met, the process proceeds to step 635 where it is determined whether both ps and pr are negative and, if so, the process proceeds to step 656. Returning to step 634, if both conditions are met, the process proceeds to step 636, where do-parse is called, with the substring of s running from the beginning of s to the character pointed to by ps equal to s. Additionally, the value of ends-with-sub? is set to true, the value of lo-exp is set equal to (rule-exp)+1, and the value of hi-exp is unchanged.

The process proceeds from step 636 to step 638, where it is determined whether do-parse returned an error in step 636 and, if not, the process proceeds to step 640, where it is determined whether matching-rule ends with a multiplier substitution or a modulus substitution. If matching-rule ends with a multiplier substitution, the process proceeds to step 642 where rule-value is set equal to (n−(n modulo (10 to the power of matching-rule's exponent) )))+rule-value. If matching-rule ends with a modulus substitution indicator, the process proceeds to step 644, where rule-value is set equal to (rule-value−(rule-value modulo rule-p10))+n. The process proceeds to step 646 from either step 642 or step 644 and in step 646 ps is set equal to next-char. From step 646 the process proceeds to step 648 where rule-value, ps, and rule are returned. From step 648, the process then proceeds to finish in step 650.

Returning now to step 638, if do-parse returned an error in step 636, the process proceeds from step 638 to step 652 where it is determined whether ps is less than best-guess-pos and, if it is, the process proceeds to step 654 where best-guess is set equal to rule-value and best-guess-pos is set equal to ps. The values returned for next-char and matching-rule by do-parse in step 636 are ignored. Following either step 652 or step 654, the process proceeds to step 656 where k is incremented and the process proceeds to step 658 where it is determined whether k is less than or equal to the number of rules in the rule set rules. If k equals or is les than the number of rules in rules, the process returns to step 606 and proceeds from there as previously described.

If k is greater than the number of rules in rules, the process proceeds from step 658 to step 660. If the process gets to step 660, there were no unambiguously "winning" rules in the rule set rules. Consequently, rule-value is set equal to best-guess and ps is set equal to best-guess-pos. The process then proceeds to step 648, and from there as previously described. If, in step 635, it is determined that ps and pr are not negative, the process proceeds to step 616 and continues matching characters and from there, as previously described.

Additional functionality, such as accommodation of negative numbers and multiple rule sets, may be supported by the parser. Because a flow chart depicting the process may prove to be so complex as to hinder, rather than enhance, understanding, an illustrative embodiment of a more complete parsing engine is set forth in the enumerated steps which follow.

The parsing engine includes a function parse, which takes an alphabetical representation and returns a numerical representation corresponding to the number having the same value as the alphabetical representation. The function parse accepts a character string and a formatting engine as inputs and may signal an error to a caller.

Another function, do-parse, handles the act of parsing for parse. The function do-parse accepts the following values as input:

A string to parse. Call this s.

A flag telling whether to consider only rules ending in a substitution or only rules that don't end in substitutions. Call this ends-in-sub? and let a "true" value mean that we should consider only rules ending in substitutions.

A reference to a rule set. Call this search-rules. If ends-in-sub? is true, the function considers rules from any rule set that end in substitutions that specify search-rules as their rule set. If ends-in-sub? is false, the function considers only rules in search-rules.

A range of acceptable divisor values for the rules that this function may consider. Call the low bound of this range lo-div and the upper bound hi-div (both are inclusive). [A divisor value is defined as a rule's radix to the power of its exponent.]

The formatter itself. and returns the following values as output:

A number representing the result of the parse. Call this n.

The character offset of the first character in the string not consumed by this call to do-parse. Call this value next-char.

A reference to the rule that ultimately matched, if any. Call this matching-rule.

Finally, let there be a third function called parse-digits that is responsible for parsing any parts of the string that are numeric values written in digits. This function accepts the following values as input:

10 A string to parse. Call this s.

A substitution. Call this sub. and returns the following values as output:

A number representing the result of the parse. Call this n.

The character offset of the first character in the string not consumed by this call to parse-digits. Call this value next-char.

For the purposes of the algorithm, let err be some constant value than can be used as a sentinel value to represent an error. parse follows the following steps:

1. If the string to be formatted is empty, signal an error to the caller and exit.
2. Let rule-sets be a list of the rule sets owned by the formatter. Let k be 0.
3. Call do-parse, passing the input string and formatter along as-is. Let ends-in-sub? be false, search-rules be rule-sets$_k$, lo-div be 0, and hi-div be some arbitrarily large value.
4. Did do-parse return err as its value for n? If not, go to step 8.
5. Did do-parse return a next-char value of −1? If so, to step 8.
6. Increment k. If k is still less than the number of rules sets in rule-sets, go back to step 3.
7. Signal an error to the caller and exit.
8. Return as output the value n returned from do-parse.

do-parse follows the following steps:
1. If ends-in-sub? is true, build a list of all the rules owned by the formatter (in any rule set) that end in a substitution that specifies search-rules as its rule set (or, if search-rules is null, that don't specify a rule set). Let rules refer to this list.
2. If ends-in-sub? is false, build a list of all the rules in search-rules that do not end with a substitution. Let rules refer to this list.
3. Let best-guess be our best-guess result value. Set it equal to err.
4. Let best-guess-pos be the string position corresponding to the first character not consumed by the best-guess result. Set it equal to the character offset of the last character of s.
5. Let k be an offset into rules. Set it to 0 (assuming zero-based indexing).
6. Let rule be equal to rules$_k$
7. Let rule-div be rule's radix raised to the power of rule's exponent. Is this greater than or equal to lo-div and less than or equal to hi-div? If not, go to step 32.
8. Let rule-text be rule's rule text. Let rule-value be rule's base value.
9. Let ps be the offset of the last character in s. Let pr be the offset of the last character in rule-text.
10. Is s$_{ps}$ equal to rule-text$_{pr}$? If not, go to step 32.
11. Decrement ps and pr.
12. Are ps less than 0 and pr greater than or equal to 0? If so, go to step 32.
13. Is pr equal to the position of a substitution in rule? If not, go to step 21.
14. Let sub be the substitution at position pr
15. If sub specifies a rule set, call do-parse, passing the substring of s running from the beginning to s$_{ps}$ as s, false for ends-with-sub?, the rule set used by sub for search-rules, 0 for lo-div, and rule-div minus 1 for hi-div. Ignore the value returned for matching-rule.
16. If sub doesn't specify a rule set, call parse-digits, passing the substring of s running from the beginning to s$_{ps}$ as s and sub as sub.
17. If do-parse or parse-digits returned err for n, go to step 32.
18. Calculate a new rule-value depending on sub's type, as follows:
    If sub is a multiplier substitution, set rule-value to n times rule-div.
    If sub is a modulus substitution, set rule-value to rule-value, minus rule-value modulo rule-div, plus n.
    If sub is a same-value substitution, leave rule-value unchanged.
    If sub is a fractional-part or integral-part substitution, add n to rule-value.
    If sub is an absolute-value substitution, negate rule-value.
    If sub is a numerator substitution, let rule-value equal n divided by rule-value.
19. Set ps equal to the value do-parse or parse-digits returned for next-char.
20. Go back to step 10.
21. Are pr less than 0 and ps greater than or equal to 0? If not, go to step 30.
22. Call do-parse, passing the substring of s running from the beginning to s$_{ps}$ as s, true for ends-with-sub?, the rule set that owns rule as search-rules, rule-div plus one for lo-div, and hi-div unchanged for hi-div.
23. Did do-parse return err for n? If not, go to step 26.
24. If ps is less than best-guess-pos, set best-guess to rule-value, and best-guess-pos to ps. Ignore the values do-parse returned for next-char and matching-rule.
25. Go to step 32.
26. Let sub be the substitution ending matching-rule.
27. Calculate a new rule-value depending on sub's type, as follows:
    If sub is a multiplier substitution, set rule-value to n, minus n modulo (matching rule's radix to the power of matching-rule's exponent), plus rule-value.
    If sub is a modulus substitution, set rule-value to rule-value, minus rule-value modulo rule-div, plus n.
    If sub is a same-value substitution, set rule-value equal to n.
    If sub is a fractional-part or integral-part substitution, add n to rule-value.
    If sub is an absolute-value substitution, negate rule-value.
    If sub is a numerator substitution, let rule-value equal rule-value divided by n.
28. Set ps equal to next-char.
29. Go to step 36.
30. If ps and pr are both less than 0, go to step 36.
31. Otherwise, go to step 10.
32. Increment k. If k is less than or equal to the number of rules in rules, go back to step 6.
33. If we get here, there were no unambiguously winning rules in the rule list. Try treating the string as ending in digits. Call parse-digits, passing s as s and an arbitrary substitution specifying a default minimum number length as sub.
34. If parse-digits returned a valid value for n and the value it returned for next-char was lower than best-guess-pos, set best-guess to n and best-guess-pos to next-char.
35. Set rule-value to best-guess and ps to best-guess-pos.
36. We're done. Return rule-value as n, ps as next-char, and rule as matching-rule.

parse-digits follows the following steps:
1. Let k be the offset of the position following the last character in s.
2. Let n be the parse result. Initialize it to err.
3. Decrement k by the minimum number of characters sub declares this substitution should produce.

[This description depends on the idea that parse-digits is to use some other system-supplied function to format and parse numeric values written in digits. This could be as simple as the C atoi( ) function, or could be something more complex, such as the Java DecimalFormat class, which allows the user to control various features of the formatted string, including minimum number of digits.]

4. Use some other system-supplied number-parsing function (such as atoi( )) to parse the substring of s running from S$_k$ to the end of the string. Let temp be the result returned by this function.

5. Is temp an error value (or did the parsing function signal a parse error in some other way)? If so, go to step 9.
6. Set n equal to temp.
7. Decrement k.
8. Is k still a valid offset within s? If so, go back to step 3.
9. Return n as n, and k as next-char.

DESCRIPTION LANGUAGE GRAMMAR

The number translation engine 200 may contain a fixed set of rules that it uses to format or parse numbers, or it may be "programmable," allowing a client (i.e., other code that makes use of the translation engine) to specify at run time the rules the number translation engine 200 is to use for formatting and parsing. A "programmable" embodiment of the number translation engine could either accept a set of rules that is provided to it by the client, or the number translation engine could build a set of rules at run time based on a textual description. In an object-oriented implementation, the translation engine's constructor might accept an alphanumeric character string containing the textual description of the rules and parse this description to build the rule list its formatting and parsing engines Will use for formatting and parsing.

In an illustrative embodiment, the textual description of the rules contains the rule text for each rule, along with symbols or tokens describing each rule's other properties, such as its base value, radix and exponent, and the positions and types of its substitutions. These properties may be expressed using a programming language, and the rule-based number translation engine's constructor could be said to "compile" this description to produce a rule set suitable for formatting and parsing. A formal grammar for one illustrative embodiment of such a programming language is set forth below.

The formal grammar defines the syntax of the language by listing a series of token definitions. A token definition consists of a token name followed by one or more alternative definitions that express the token in terms of literal characters (in bold) or other tokens (in italics). "spellout-format-description" refers to an entire rule-set description. This is then broken down into smaller and smaller tokens until a series of strings of literal characters that satisfy the requirements of the grammar are produced.

As an example, consider this description of an (old-style) telephone number:
telephone-number
    area-code exchange number
    exchange number
area-code:
    not-1-or-0 1-or-0 digit
exchange:
    not-1-or-0 not-1-or-0 digit
number:
    digit digit digit digit
not-1-or-0:
    2
    3
    4
    5
    6
    7
    8
    9
1-or-0:
    0
    1
digit.
    1-or-0
    not-1-or-0

The telephone number may or may not include an area code. The first digit of the area code can be any digit but 1 or 0. The second digit must be 1 or 0, and the third digit may be anything. The first and second digits of the exchange may be any digit but 1 or 0, but the last digit may by anything All four digits of the number may be any digit.

The formal grammar for one illustrative embodiment of a programming language suitable for describing a rule set for the new number translation engine is as follows:
spellout-format-description:
    rule-set-list
    rule-list
rule-set-list:
    rule-set
    rule-set rule-set-list
rule-set:
    rule-set-name: rule-list
rule-set-name:
    % rule-set-name-characters
    % rule-set-name-characters
rule-set-name-characters:
    (any non-whitespace characters except % ;:<>=)
rule-list:
    rule
    rule rule-list
rule:
    rule-body;
    rule-descriptor: rule-body;
rule-descriptor:
    base-value
    base-value/radix
    .
    −
base-value:
    number
    number adjuster
adjuster:
    >
    >adjuster
radix:
    number
number:
    (any sequence of 0 1 2 3 4 5 6 7 8 9,. or whitespace)
rule-body:
    text-with-substitutions
    text-with-substitutions[text-with-substitutions]text-with-substitutions
text-with-substitutions:
    text
    text substitution text
    text substitution text substitution text
text.
    (the empty string)
    (any sequence of characters other than;)
substitution:
    <<

```
<substitution-designation<
>>
>substitution-designation>
=substitution-designation=
substitution-designation:
    rule-set-name
    decimal-format-pattern
decimal-format-pattern:
    #
    0
```

(an implementation-defined string beginning with # or 0)

In the illustrative embodiment, a spellout-formatter description consists of one or more rule sets, which are semicolon-delimited.

A rule set consists of a name, which may be omitted if the engine has only one rule set, followed by one or more rules. The name starts with a %. If it starts with two % s, that means it is an internal rule set—that is, a rule set that exists only to be called by other rule sets—a client of the format( ) function can't specify an internal rule set as the one to use. The name of a rule set is separated from the rules by a colon.

The rules in a rule set are separated from one another by semicolons. Leading space at the beginning of a rule (i.e., following a semicolon) is ignored. A rule may begin with an optional rule descriptor which is separated from the rule body by a colon. Again, leading space following the colon is ignored. A rule descriptor may be "−", which denotes the negative-number rule, ".", which denotes the fraction rule, or a number with optional qualifiers. If the rule descriptor is a number, the number (which may contain periods, commas, and whitespace, all of which are ignored) specifies the rule's base value and may be followed by one or more optional >signs, each of which subtracts 1 from the rule's calculated exponent value. The number may also be followed by an optional second number (separated from the first by a slash) which specifies the rule's radix. If a rule's radix isn't specified, it defaults to 10. If a rule's base value isn't specified (i.e., if the rule descriptor is omitted), it defaults to the preceding rule's base value plus one (if it's the first rule in the rule set, the base value defaults to 0).

The rule body specifies the rule's rule text, and may contain any character except the semicolon. If the rule body begins with an apostrophe, the leading apostrophe is not included in the rule text (this is to provide a way to specify a rule that begins with whitespace). The rule body may include an optional run of text enclosed in brackets. The bracket notation is a shorthand method of creating two rules: a rule that includes text in brackets specifies both a rule with the same base value that omits the text in the brackets and a rule with the next-higher base value that includes the text in the brackets (e.g., "20: twenty[→>];" specifies both "20: twenty;" and "21: twenty→>;"). Illustratively, the rule's minor substitution (see below) is included in the brackets, and the brackets are used as a way of specifying text that should only be included if there is a minor substitution.

The rule body may also contain optional tokens specifying the positions and properties of the rule's substitutions. The basic substitution tokens are "<<", ">>", and "==". A rule set name or a decimal-format description may be placed between the delimiter characters. The rule set name specifies the rule set to be used to perform the substitution (if omitted, the substitution will use the rule set that contains it). A decimal-format description is intended to be a pattern that can be passed, for example, to the constructor of a Java DecimalFormat object, and denotes that the substitution should format its value is digits using a DecimalFormat (other means of formatting in digits could be substituted here; in its simplest form, the decimal-format description could just be "#" or "0").

The character string "<<" denotes a "major substitution" and the character string ">>" denotes a "minor substitution". The meaning of "major substitution" and "minor substitution" are context-dependent. That is, in a unormal" rule (i.e., neither a negative number nor a fraction rule), a major substitution is a multiplier substitution and the minor substitution is a modulus substitution. In a fraction rule, the major substitution is an integral-part substitution and the minor substitution is a fractional-part substitution. In a negative-number rule, the minor substitution is an absolute-value substitution and the major substitution is not allowed. The character string "==" denotes a same-value substitution. In fact, the character string "==" is not actually a permissible token in the illustrative embodiment, as a rule set name or a decimal-format descriptor must always be placed between the equal signs. Without a rule set name or decimal format descriptor between the equal signs, the default rule set would lead to infinite recursion.

A rule set is a fraction rule set rather than a normal rule set if it appears in the minor (i.e., fractional-part) substitution of a fraction rule. The same rule set may not be designated both by a fractional-part substitution and by any other kind of substitution. In the rules in a fraction rule set, the major substitution is a numerator substitution and the minor substitution isn't allowed. A rule with an exponent of 0 may not have a major (i.e., multiplier) substitution because this would lead to infinite recursion. If a rule body contains more than two substitution tokens, or contains a token for a substitution that isn't allowed in that context, the extra tokens remain undisturbed as part of the rule text. If the rules are out of order, they're sorted as part of the process of building the formatter's internal rule lists. If more than one negative-number rule or fraction rule occurs in a given rule set, only the last one is used. Similarly, if multiple rules with the same base value appear, only the last one is used. In neither case is an error signaled.

SAMPLE RULE SETS

An illustrative listing of rule set descriptions that may be used with the new number translation engine to format numerical values in their internal numerical representation into textual character strings or to parse textual character strings into numbers in their internal numerical representation is set forth below. These rule-set descriptions are written following the syntax and semantics of the rule-description language described in the previous section. The sets may be extended to large values by appropriate addition of rules, thereby increasing the value at which the OUT OF RANGE indication becomes applicable.

English (U.S.):
zero; one; two; three; four; five; six; seven; eight; nine; ten; eleven; twelve; thirteen; fourteen; fifteen; sixteen; seventeen; eighteen;
nineteen;
twenty[→>];
30: thirty[→>];
40: forty[→>];
50: fifty[→>];
60: sixty[→>];
70: seventy[→>];
80: eighty[→>];
90: ninety[→>];
100: <<hundred[>];
1000: <<thousand[>>];

1,000,000: <<million[>>];
1,000,000,000: <<billion[>>];
1,000,000,000,000: <<trillion[>>];
1,000,000,000,000,000: OUT OF RANGE!;
−: minus >>;
.: <<point >>;
   English (U.K.):
zero; one; two; three; four; five; six; seven; eight; nine;
ten; eleven; twelve; thirteen; fourteen; fifteen; sixteen; seventeen; eighteen;
nineteen;
twenty[→>];
30: thirty[→>];
40: forty[→>];
50: fifty[→>];
60: sixty[→>];
70: seventy[→>];
80: eighty[→>];
90: ninety[→>];
100: <<hundred[>>];
1000: <<thousand[>>];
1,000,000: <<million[>>];
1,000,000,000: <<billion[>>];
1,000,000,000,000,000,000: OUT OF RANGE!;
−: minus >>;
.: <<point >>;
   Spanish:
zero; uno; dos; tres; cuatro; cinco; seis; siete; ocho; nueve;diez; once; doce;
trece; catorce; quince; dieciséis; diecisiete; dieciocho; diecinueve; veinte;
veintiuno; veintidós; veintitrés; veinticuatro; veinticinco; veintiséis; veintisiete;
veintiocho; veintinueve; treinta[y >>];
40: cuarenta[y >>];
50: cincuenta[y >>];
60: sesenta[y >>];
70: setenta[y >>];
80: ochenta[y >>];
90: noventa[y >>];
100: cien;
101: ciento >>;
200: doscientos[>>];
300: trescientos[>>];
400: cuatrocientos[>>];
500: quinientos[>>];
600: seiscientos[>>];
700: setecientos[>>];
800: ochocientos[>>];
900: novecientos[>>];
1000: mil[>>];
2000: <<mil[>>];
1,000,000: un millión[>>];
2,000,000: <<millión[>>];
1,000,000,000: OUT OF RANGE (incomplete data);
   Italian (with the Flowcharted Engines):
zero; uno; due; tre; quaftro; cinque; sei; sefte; otto; nove;
dieci; undici; dodici; tredici; quaftordici; quindici; sedici; diciasette;
diciofto; diciannove;
venti; ventuno; venti>>; 28: ventotto; ventinove;
trenta; trentuno; trenti>>; 38: trentotto; trentinove;
quaranta; quarantuno; quaranta>>; 48: quarantotto; quarantanove;
cinquanta; cinquantuno; cinquanta>>; 58: cinquantofto; cinquantanove;
sessanta; sessantuno; sessanta>>; 68: sessantotto; sessantanove;
seftanta; seftantuno; seftanta>>; 78: seftantotto; settantanove;
ottanta; ottanuno; ottanta>>; 88: ottantofto; ottantanove;
novanta; novantuno; novanta>>; 98: novantotto; novantanove;
cento[>>];
200: <<cento[>>];
1000: mille[>>];
2000: <<mila[>>];
100,000>>: <<mila[>>];
1,000,000: OUT OF RANGE (incomplete data);
   Italian (with Enumerated Engines Algorithm):
% main:
zero; uno; due; tre; quattro; cinque; sei; sette; otto; nove;
dieci; undici; dodici; tredici; quattordici; quindici; sedici; diciasette;
diciotto; diciannove;
venti; vent>% %20-alt-ones>;
trenta; trent>% % alt-ones>;
quaranta; quarant>% alt-ones>;
cinquanta; cinquant>% % alt-ones>;
sessanta; sessant>% % alt-ones>;
settanta; settant>% % alt-ones>;
ottanta; ottant>% alt-ones>;
novanta; novant>% alt-ones>;
cento[>>];
200: <<cento[>>];
1000: mille[>>];
2000: <<mila[>>];
100,000>>: <<mila[>>];
1,000,000: OUT OF RANGE (incomplete data);
% % alt-ones:
; uno; adue; atre; aquattro; acinque; asei; asette; otto; anove; =% main=;
% %20-alt-ones:
uno; idue; itre; iquattro; icinque; isei; isette; otto; inove; =% main=;
   French (France, Canada, with the Flowcharted Engines):
zéro; un; deux; trois; quatre; cinq; six; sept; huit; neuf; dix;
onze; douze; treize;
quatorze; quinze; seize; dix-sept; dix-huit; dix-neuf; vingt; vingt-et-un; vingt→>
30: trente; trente-et-un; trente→>
40: quarante; quarante-et-un; quarante→>;
50: cinquante; cinquante-et-un; cinquante→>;
60: soixante; soixante-et-un; soixante→>;
70: soixante-dix; soixante et onze; soixante-douze; soixante-treize;
soixante-quatorze;soixante-quinze; soixante-seize; soixante-dix-sept;
soixante-dix-huit; soixante-dix-neuf; quatre-vingts; quatre-vingt→>;
90: quatre-vingt-dix; quatre-vingt-onze; quatre-vingt-douze; quatre-vingt-treize;
quatre-vingt-quatorze; quatre-vingt-quinze; quatre-vingt-seize;
quatre-vingt-dix-sept; quatre-vingt-dix-huit; quatre-vingt-dix-neuf;
cent[>>];
is 200: <<cents[>>];
1000: mille[>>];
1100>: onze cents[>>];
1200: mille >>;
2000: <<mille[>>];
1,000,000: <<million[>>];
1,000,000,000: <<milliarde[>>];
1,000,000,000,000: <<billion[>>];

1,000,000,000,000,000: OUT OF RANGE!;
French (France, Canada, with the Enumerated Engines):
% main:
zéro; un; deux; trois; quatre; cinq; six; sept; huit; neuf;
dix; onze; douze; treize; quatorze; quinze; seize; dix-sept; dix-huit;
dix-neuf;
vingt[→% % alt-ones>];
30: trente[→% % alt-ones>];
40: quarante[→% % alt-ones>];
50: cinquante[→% % alt-ones>];
60/20: soixante[→% % alt-ones>];
71: soixante et onze;
72/20: soixante→% % alt-ones>;
80: quatre-vingts; 81/20: quatre-vingt→>;
100: cent[>>];
200: <<cents[>>];
1000: mille[>>];
1100>: onze cents[>>];
1200: mille >>;
2000: <<mille[>>];
1,000,000: <<million[>>];
1,000,000,000: <<milliarde[>>];
1,000,000,000,000: <<billion[>>];
1,000,000,000,000,000: OUT OF RANGE!;
% % alt-ones:
; et-un; =% main=;
French (Switzerland, with the Flowcharted Engines):
zero; un; deux; trois; quatre; cinq; six; sept; huit; neuf;
dix; onze; douze; treize; quatorze; quinze; seize; dix-sept; dix-huit; dix-neuf;
vingt; vingt-et-un; vingt→>
30: trente; trente-et-un; trente→>
40: quarante; quarante-et-un; quarante→>;
50: cinquante; cinquante-et-un; cinquante→>;
60: soixante; soixante-et-un; soixante→>;
70: septante; septante-et-un; se ptante→>;
80: octante; octante-et-un; octante→>;
90: nonante; nonante-et-un; nonante→>;
cent[>>];
200: <<cents[>>];
1000: mille[>>];
1100>: onze cents[>>];
1200: mille >>;
2000: <<mille[>>];
1,000,000: <<million[>>];
1,000,000,000: <<milliarde[>>];
1,000,000,000,000: <<billion[>>];
1,000,000,000,000,000: OUT OF RANGE!;
German (with the Flowcharted Engines):
null; eins; zwei; drei; vier; fünf; sechs; sieben; acht; neun;
zehn; elf; zwölf; >>zehn;
20: zwanzig; einundzwanzig; >>undzwanzig;
30: dreißig; einunddreißig; >>unddreißig;
40: vierzig; einundvierzig; >>undvierzig;
50: fünfzig; einundfünfzig; >>undfünfzig;
60: sechzig; einundsechzig; >>undsechzig;
70: siebzig; einundsiebzig; >>undsiebzig;
80: achtzig; einundachtzig; >>undachtzig;
90: neunzig; einundneunzig; >>undneunzig;
100: hundert[>>];
200: <<hundert[>>];
1000: tausend[>>];
2000: <<tausend[>>];
1,000,000: eine Million[>>];
2,000,000: <<Millionen[>>];
1,000,000,000: eine Milliarde[>>];
2,000,000,000: <<Milliarden[>>];
1,000,000,000,000: eine Billion[>>];
2,000,000,000,000: <<Billionen[>>];
1,000,000,000,000,000: OUT OF RANGE!;
German (with the Enumerated Engines):
% alt-ones:
null; eins; =% % main=;
% % main:
null; ein; zwei; drei; vier; fünf; sechs; sieben; acht; neun;
zehn; elf; zwölf; >>zehn;
20: [>>und]zwanzig
30: [>>und]dreißig
40: [>>und]vierzig;
50: [>>und]fünfzig;
60: [>>und]sechzig;
70: [>>und]siebzig;
80: [>>und]achtzig;
90: [>>und]neunzig;
100: hundert[>>];
200: <<hundert[>>];
1000: tausend[>>];
2000: <<tausend[>>];
1,000,000: eine Million[>>];
2,000,000: <<Millionen[>>];
1,000,000,000: eine Milliarde[>>];
2,000,000,000: <<Milliarden[>>];
1,000,000,000,000: eine Billion[>>];
2,000,000,000,000: <<Billionen[>>];
1,000,000,000,000,000: OUT OF RANGE!;
Swedish:
noll; eft; två; tre; fyra; fem; sex; sjo; åtta; nio;
tio; elva; tolv; tretton; fjorton; femton; sexton; sjutton; arton; nitton;
tjugo[>>];
30: trettio[>>];
40: fyrtio[>>];
50: femtio[>>];
60: sextio[>>];
70: sjuttio[>>];
80: åttio[>>];
90: nittio[>>];
100: hundra[>>];
200: <<hundra[>>];
1000: tusen[>>];
2000: <<tusen[>>];
1,000,000: en miljon[>>];
2,000,000: <<miljon[>>];
1,000,000,000: en miljard[>>];
2,000,000,000: <<miljard[>>];
1,000,000,000,000: en biljon[>>];
2,000,000,000,000: <<biljon[>>];
1,000,000,000,000,000: OUT OF RANGE!
Japanese 零; 一; 二; 三; 四; 五; 六; 七; 八; 九;
+[>>];
20: <<+[>>];
100: 百[>>];
200: <<百[>>];
1000: [>>];
2000: <<[>>];
10,000: <<万[>>];
100,000,000: <<億[>>];
1,000,000,000,000: <<兆[>>];
10,000,000,000,000,000: OUT OF RANGE!
Greek ???; ενα; δυο; τρια; τεσσερα; πεντε; εξι; επτα; οκτω;
10: δεκα; ενδενα; δωδενα; δεκα>>;
20: εινοσι; εινοσι>>;
30: τριαντα; τριαντα>>;
40: σαραντα; σαραντα>>;
50: πενηντα; πενηντα>>;
60: εξηντα; εξηντα>>;
70: εβδομηντα; εβδομηντα>>;
80: ογδόντα; ογδομηντα>>;
90: εννενηντα; εννενηντα>>;
100: εκατό[ν>>]
200: διακόσια[>>];
300: τριακόσια[>>];
400: τετρακόσια[>>];
500: πεντακόσια[>>];
600: εξακόσια[>>];
700: επτακόσια[>>];
800: οκτακόσια[>>];
900: εννιακόσια[>>];
1000: χιλια[>>];
1,000,000: <<εκατομμιόριο[>>];
1,000,000,000: <<δισεκατομμιρι[>>];
1,000,000,000,000: OUT OF RANGE!
Russian
ноль; один; два; три; четыре; пят; шест; семь; восемь; девят;
10 :
15: десят; одиннадцать; двеннадцать; тринадцать; четырнадцать; пятнадцать; шестнадцать;
семнадцать; восемнадцать; девятнадцать;
20: двадцать[>>];
30: тридцать[>>];
40: сорок[>>];
50: пятьдесят[>>];
60: шестьдесят[>>];
70: семьдесят[>>];
80: восемьдесят[>>];
90: девяносто[>>];
100: сто[>>];
200: <<сто[>>];
1000: тысяча[>>];
2000: <<тысяча[>>];
1,000,000: миллион[>>];
2,000,000: <<миллион[>>];
1,000,000,000: OUT OF RANGE!
Hebrew (visual order, substitution marks reversed for readability)
???; אחד; שניים; שלושה;
4: ארבעה; חמישה; שישה;
7: שבעה; שמונה; תשעה;
10: צשרה[<<];
20: עשרים[<<];
30: שלושים[<<];
40: ארבעים[<<];
50: חמישים[<<];
60: ששים[<<];
70: שבעים[<<];
80: שמונים[<<];
90: תשעים[<<];
100: מאה[<<];
1000: אלף[<<];
1,000,000: OUT OF RANGE (incomplete data);

Various Other Formatting Problems:
Cardinal and Ordinal Numbers:
% card:
zero; one; two; three; four; five; six; seven; eight; nine;
ten; eleven; twelve; thirteen; fourteen; fifteen; sixteen; seventeen;
eighteen; nineteen;
twenty[→>];
30: thirty[→>];
40: forty[→>];
50: fifty[→>];
60: sixty[→>];
70: seventy[→>];
80: eighty[→>];
90: ninety[→>];
100: <<hundred[>>];
1000: <<thousand[>>];
1,000,000: <<million[>>];
1,000,000,000: <<billion[>>];
1,000,000,000,000: <<trillion[>>];
1,000,000,000,000,000: OUT OF RANGE!;
% ord:
zeroth; first; second; third; fourth; fifth; sixth; seventh; eighth; ninth;
tenth; eleventh; twelfth; thirteenth; fourteenth; fifteenth; sixteenth;
seventeenth; eighteenth; nineteenth;
twentieth; twenty→>;
30: thirtieth; thirty→>;
40: fortieth; forty→>;
50: fiftieth; fifty→>;
60: sixtieth; sixty→>;
70: seventieth; seventy→>;
80: eightieth; eighty→>;
90: ninetieth; ninety→>;
100: <% card<hundredth;<% card<hundred >>;
1000: <% card<thousandth;<% card<thousand >>;
1,000,000: <% card<millionth;<% card<million >>;
1,000,000,000: <% card<billionth;<% card<billion >>;
1,000,000,000,000: <% card<trillionth;<% card<trillion >>;
1,000,000,000,000,000: OUT OF RANGE!;
More sophisticated English Spellout:
% main:
zero; one; two; three; four; five; six; seven; eight; nine; ten; eleven; twelve;
thirteen; fourteen; fifteen; sixteen; seventeen;eighteen; nineteen;
twenty[→>];
30: thirty[→>];
40: forty[→>];
50fifty[→>]:
60: sixty[→>];
70: seventy[→>];
80: eighty[→>];
90: ninety[→>];
100: <<hundred[>% % and>];
1000: <<thousand[>% % and>];
100,000: <<thousand[>% % commas>];
1,000,000: <<million[>% % commas>];
1,000,000,000: <<billion[>% % commas>];
1,000,000,000,000: <<trillion[>% % commas>];
1,000,000,000,000,000: OUT OF RANGE!;
% % and:
and =% main=;
100: =% main=;
% % commas:
and =% main=;

100: , =% main=; 1000: , <% main<thousand, >% main>;
   1,000,000: =% main=;
   Another English Spellout Variant:
% main:
zero; one; two; three; four; five; six; seven; eight; nine; ten;
   eleven; twelve;
thirteen; fourteen; fifteen; sixteen; seventeen; eighteen;
   nineteen;
twenty[→>];
30: thirty[→>];
40: forty[→>];
50: fifty[→>];
60: sixty[→>];
70: seventy[→>];
80: eighty[→>];
90: ninety[→>];
100: <<hundred[>>];
1000>: <% % hundreds<[>>];
10,000: =% % alt-thousands=;
1,000,000: <<million[>% % alt-thousands>];
1,000,000,000: <<billion[>% % alt-thousands>];
1,000,000,000,000: <<trillion[>% % alt-thousands>];
1,000,000,000,000,000: OUT OF RANGE!;
% % alt-thousands:
=% main=;
1000: <<thousand[>% main>];
1,000,000: =% main=;
% % hundreds:
0: SHOULD NEVER GET HERE!
10: <% main<thousand;
11: =% main=hundred>% % empty>;
% % empty:
0:;

This rule set requires some explanation. What we're trying to do here is have the numbers between 1,000 and 9,999 be rendered as "xx hundred yy" when the second digits is something other than 0 and "x thousand yy" when the second digit is 0. In other words, 2,345 would be "twenty-three hundred forty-five," but 2,045 would still be "two thousand forty-five." % % alt-thousands and the rules in % main that call it restore the normal behavior for values of 10,000 and over.

For values between 1,000 and 9,999, the rule for 1,000 is in effect. It and the rule sets it calls perform some serious black magic to achieve our end. First, we use > to decrement the rule's power of 10 so that the value passed to % % hundreds is the first two digits of the number, not just the first digit. (This also causes >> to format just the last two digits instead of the last three.) The value that gets pass to % % hundreds will thus be between 10 and 99. If it's 10 (or a multiple of 10, as we'll see in a minute), we use a multiplier substitution to isolate the first digit and render it with "thousand." If it's 11 (or anything else that's not a multiple of 10), the second uses a same-value substitution to render both digits with "hundred."

The minor substitution in the 11 rule calls a separate rule set that always returns the empty string. It's only there to trigger the rollback rule: That is, if the value we'd pass to % % empty is 0, we use the 10 rule instead, which is how we get "thousand" on all even multiples of 1,000 without specifying a rule for each one. This actually assumes the algorithm invokes the rollback rule on any rule with two substitutions, not just rules with both multiplier and modulus substitutions.

Check Amounts:
% user:
0: =% % main=and 00/100;
.: <% % main>and >% % cents>;
% % main:
zero; one; two; three; four; five; six; seven; eight; nine;
ten; eleven; twelve; thirteen; fourteen; fifteen; sixteen; seventeen;
eighteen; nineteen;
twenty[→>];
30: thirty[→>];
40: forty[→>];
50: fifty[→>];
60: sixty[→>];
70: seventy[→>];
80: eighty[→>];
90: ninety[→>];
100: <<hundred[>>];
1000: <<thousand[>>];
1,000,000: <<million[>>];
1,000,000,000: <<billion[>>];
1,000,000,000,000: <<trillion[>>];
1,000,000,000,000,000: OUT OF RANGE!;
% % cents:
100: <00</100;

This rule set produces spelled-out numbers the way you normally see them written on checks. The normal formatting rule set, % % main, is an internal rule set this time—the user calls % user. This fixes it so we see "and xx/100" even when the value is an even number of dollars. When we have cents, the decimal rule in % user calls % cents, which is a fraction rule set. Its one rule, which will always be used, treats the fractional part as a fraction with a denominator of 100 (its base value). The numerator of the fraction (the major substitution) is rendered with a DecimalFormat (i.e., in digits), and the "00" is a DecimalFormat pattern specifying a minimum of two digits (giving us "ten and 02/100" for $10.02).

Ordinal Number Abbreviations:
% main:
=0==% % abbrev=;
10: =0=>% % abbrev>;
% % abbrev:
th; st; nd; rd; th;

Abbreviated Numbers:
% main:
=0=;
10,000>: <0<thousand;
1,000,000: <0<[>% % hundred-thousand] million;
10,000,000: <0<million;
1,000,000,000: <0<[>% % hundred-million] billion;
10,000,000,000: <0<billion;
1,000,000,000,000: <0<[>% % hundred-billion] trillion;
10,000,000,000,000: <0<trillion;
% % hundred-thousand:
0:;
100,000:. <0<;
% % hundred-million:
0:;
100,000,000:. <0<;
% % hundred-billion:
0:;
100,000,000,000:.<0<;

This rule set renders large numbers in abbreviated form. Numbers below 10,000 are rendered normally in digits. Numbers above 10,000 are rendered with two or three significant digits and a word indicating the magnitude: for example, 2,345,678 is rendered as "2.3 million."

Roman Numerals:
;I; II; III; IV; V; VI; VII; VIII IX;
10: X[>>];
20: XX[>>];
30: XXX[>>];
40: XL[>>];
50: L[>>];
60: LX[>>];
70: LXX[>>];
80: LXXX[>>];
90: XC[>>];
100: C[>>];
200: CC[>>];
300: CCC[>>];
400: CD[>>];
500: D[>>];
600: DC[>>];
700: DCC[>>];
800: DCCC[>>];
900: CM[>>];
1000; M[>>];
2000: MM[>>];
3000: MMM[>>];
4000: OUT OF RANGE!;
  Message Formatting:
% main:
  The search found =% % value=.
% % value:
no files; one file; two files; three files; four files; five files;
  six files; seven files; eight files; nine files;
=0=files;
  Changing Dimensions:
% user:
0: =% % small=;
1: =% % big=;
% % small:
0:;
.: >% % small2>;
% % small2:
1,000: <0<mm;
1,000,000: <0<μm;
1,000,000,000: <0<nm;
1,000,000,000,000: <0<pm;
% % big:
0: <0<m;
1,000: <0<km;
1,000,000: <0<Mm;
1,000,000,000: 0<Gm:
1,000,000,000,000: <0<Tm;
  Message Formatting and Changing Dimensions
% usr:
  There =% % main=free space on the disk.
% % main:
is no;
are =0=bytes of;
1024/1024: is <0<K of;
1,048,576/1024: are <0<Mb of;
  Hours, Minutes, and Seconds (Original Value in Seconds):
% main:
0 seconds; 1 second; =0=seconds;
60/60: <% % min<[,>>];
3600/60; <% % hr<[,>>];
% % min:
0 minutes: 1 minute; =0=minutes;
% % hr:
0 hours; 1 hour; =0=hours;

Hours, Minutes, and Seconds (Original Value in Hours):
% main:
0:; 1: 1 hour; 2: =0=hours;
.:<<% % frac>;
% % frac:
60: <% % min<;
3600: <% % sec<;
% % min:
0 minutes; 1 minute; =0=minutes;
% % sec:
0:; 1 second; =0=seconds;
60/60: 1 minute[,>>];
120/60: <0<minutes[,>>];
  Hours, Minutes, and Seconds (Abbreviated, Original Value in Seconds):
0: :=00=;
60/60: <00<>>;
3600/60: <0<:>>;
  Hours, Minutes, and Seconds (Abbreviated, Original Value in Hours):
% main:
=0=:00:00;
<0<:>% % frac>;
% % frac:
60: <00<:00;
3600: <% % secs<:
% % secs:
0: 00: >00>;
60/60: <00<:>00>;
  Stock Prices:
% main:
0: =0=;
.: <0<>% % frac>;
% frac:
2:'<0</2;
4:'<0</4;
8:'<0</8;
16:'<0<16;
32:'<0</32;
100:..<00<;
  Regular Western ("Arabic") Numerals: 0; 1; 2; 3; 4; 5; 6; 7: 8; 9;
<<>>;
100: <<>>;
1000: <<>>;
1,000,000: <<>>;
1,000,000,000: <<,>>;
1,000,000,000,000: <<,>>;
1,000,000,000,000,000: OUT OF RANGE!
-:→>;
.:<<.>>;

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Further, such modifications to the inventive concept are intended to be covered by the appended claims.

What is claimed is:

1. An apparatus for converting a numerical representation of a number into a natural language representation of the number, comprising:
   a plurality of rules, each rule including a natural language text segment and one or more numerical values for which the rule is applicable;
   means for identifying one or more rules which are applicable; and
   a formatter responsive to the numerical representation for constructing an alphabetical representation by combining the text segments of the applicable rules.

2. The apparatus of claim 1 wherein the numerical representation is a multiple digit numerical representation and the formatter comprises a formatting engine which comprises means for identifying one or more rules which are applicable to each digit.

3. The apparatus of claim 1 wherein the numerical representation is a multiple digit numerical representation and at least one of the plurality of rules includes a substitution section which modifies an order in which rule text segments are combined depending on the sequence of digits in the numerical representation.

4. The apparatus of claim 1 wherein the plurality of rules are arranged so that every number between a predetermined smallest number and a predetermined largest number has at least one applicable rule.

5. The apparatus of claim 1 wherein the plurality of rules are arranged so that at least one of the plurality of rules is applicable to a predetermined range of numbers.

6. The apparatus of claim 1 wherein the numerical representation is a multiple digit numerical representation and wherein the predetermined range of numbers includes all numbers for which a digit is greater than zero.

7. The apparatus of claim 1 wherein the numerical representation is a multiple digit numerical representation and wherein the plurality of rules are arranged in a hierarchy with each rule in the hierarchy corresponding to one of the digits in the numerical representation.

8. The apparatus of claim 7 wherein the formatter comprises a mechanism which constructs the natural language representation from rule text segments in rules in the hierarchy starting from an applicable rule corresponding to the highest-valued digit and proceeding in descending order to an applicable rule corresponding to the lowest-valued digit.

9. The apparatus of claim 1 wherein the formatter comprises a mechanism which constructs the alphabetical representation by concatenating the text segments of the applicable rules.

10. The apparatus of claim 9 wherein the numerical representation is a multiple digit numerical representation and at least one of the plurality of rules includes a substitution section which modifies an order in which rule text segments are concatenated.

11. The apparatus of claim 10 wherein said formatter is responsive to a rule set supplied by a client.

12. The apparatus of claim 11 wherein said formatter is responsive to a textual description of a rule set supplied by a client, whereby said formatter constructs a rule set from said textual description.

13. A translation engine configured to convert a numerical representation of a number into a natural language alphabetical representation of the number, comprising:
   a formatter, comprising:
      a rule set that comprises a plurality of rules, the plurality of rules being common to an associated parsing engine, each rule of which includes a rule text and an indication of one or more numerical values for which the rule is applicable; and
      a formatting engine configured to receive a numerical representation of a number and to determine which of the rules within the rule set is applicable to the number and to construct an alphabetical representation of the number comprising the rule texts associated with a plurality of applicable rules.

14. The translation engine of claim 13, wherein the parsing engine is configured to convert an alphabetical representation of a number into a numerical representation of the number, the parsing engine configured to receive an alphabetical representation and to search the rule set to determine which of the rules includes an applicable rule text and to construct a numerical representation comprising, the numerical values from at least two applicable rules.

15. A translation engine configured to convert a numerical representation of a number into a natural language alphabetical representation of the number, comprising:
   a formatter, comprising:
      a rule set that comprises a plurality of rules, each rule of which includes an indication of one or more numerical values for which the rule is applicable and a rule text, one of the rules including a substitution indicator which indicates where, in relation to the rule's rule text, another rule text may be positioned in order to construct an alphabetical representation of a number corresponding to a numerical representation of the number; and
      a formatting engine configured to receive a numerical representation of a number and to determine which of the rules within the rule set is applicable to the number and to construct an alphabetical representation of the number comprising the rule text associated with the applicable rule.

16. The translation engine of claim 15 wherein said formatting engine is configured to form an alphabetical representation of a number by constructing the representation from rule texts in descending order from the applicable rule having the highest range of applicability to the rule having the lowest range of applicability.

17. The translation engine of claim 15 wherein the rule set is an ordered list and each rule within the list includes a base value, the combination or rule ordering and base values indicating the range of number values for which each rule is applicable.

18. The translation engine of claim 15 wherein said substitution indicator indicates a position relative to the rule text of the rule which includes the substitution indicator where a rule text of another rule may be inserted in order to construct the alphabetical representation.

19. The translation engine of claim 18 wherein the location at which a second rule text is inserted relative to a first rule text is determined by whether the number for which the first rule text is an alphabetical representation is a multiple of the number for which the second rule text is an alphabetical representation.

20. The translation engine of claim 15 wherein the rule set comprises a negative number rule which the formatting engine employs to provide an alphabetical representation of a numerical representation of a negative number.

21. The translation engine of claim 15 wherein the rule set comprises a fractional number rule which the formatting engine employs to provide an alphabetical representation of a numerical representation of a fractional number.

22. The translation engine of claim 18 wherein the location at which a second rule text is inserted relative to a first rule text is determined by whether the number for which the second rule text is an alphabetical representation is added to the number for which the first rule text is an alphabetical representation in the formation of a natural language representation of the number.

23. The translation engine of claim 15 further comprising a plurality of rule sets.

24. The translation engine of claim 23 wherein the formatter converts a numerical representation of a number into an alphabetical representation of the number in any of a plurality of languages and each of the plurality of languages has a separate rule set associated with it.

25. The translation engine of claim 24 wherein the formatter employs rule text from more than one rule set to construct a single alphabetical representation.

26. The translation engine of claim 25 wherein each rule within a rule set includes an indication of the radix of all the rules within the rule set and the formatter employs the radix in constructing the alphabetical representation.

27. A computer program product for use with a computer system, the computer program product comprising a computer usable medium having computer readable program code written thereon, the program code comprising:

program code configured to form a rule set that comprises a plurality of rules, each of which includes a range indicator and a rule text, the range indicator indicating a range of numerical values for which the rule is applicable, one of the rules including a substitution indicator which indicates where, in relation to the rule's rule text, another rule text may be positioned in order to construct an alphabetical representation of a number corresponding to a numerical representation of the number; and program code configured to receive a numerical representation of a number and to determine which of the rules within the rule set is applicable to the number and to construct an alphabetical representation of the number, the alphabetical representation comprising the rule text associated with the applicable rule.

28. The computer program product of claim 27 further comprising program code which is configured to format an alphabetical representation of a number by constructing the representation from rule texts in descending order from the applicable rule having the highest range of applicability to the applicable rule having the lowest range of applicability.

29. The computer program product of claim 27 wherein the rule set is an ordered list and each rule within the list includes a base value, the combination of rule ordering and base values indicating the range of number values for which each rule is applicable.

30. The computer program product of claim 27 wherein said substitution indicator indicates a position relative to the rule text of the rule which includes the substitution indicator where a rule text of another rule may be inserted in order to construct the alphabetical representation.

31. The computer program product of claim 30 wherein the location at which a second rule text is inserted relative to a first rule text is determined by whether the number for which the first rule text is an alphabetical representation is a multiple of the number for which the second rule text is an alphabetical representation.

32. The computer program product of claim 27 wherein the rule set comprises a negative number rule which the program code configured to receive a numerical representation employs to provide an alphabetical representation of a numerical representation of a negative number.

33. The computer program product of claim 27 wherein the rule set comprises a fractional number rule which the program code configured to receive a numerical representation employs to provide an alphabetical representation of a numerical representation of a fractional number.

34. The computer program product of claim 30 wherein the location at which a second rule text is inserted relative to a first rule text is determined by whether the number for which the second rule text is an alphabetical representation is added to the number for which the first rule text is an alphabetical representation in the formation of a natural language representation of the number.

35. The computer program product of claim 30 further comprising a plurality of rule sets.

36. The computer program product of claim 35 wherein the program code configured to receive a numerical representation converts a numerical representation of a number into an alphabetical representation of the number in any of a plurality of languages and each of the plurality of languages has a rule set associated with it.

37. The computer program product of claim 34 wherein the program code configured to receive a numerical representation employs rule text from more than one rule set to construct a single alphabetical representation.

38. The computer program product of claim 27 wherein each rule within a rule set includes an indication of the radix of all the rules within the rule set and the program code configured to receive a numerical representation employs the radix in constructing the alphabetical representation.

* * * * *